United States Patent [19]
Takashige et al.

[11] Patent Number: 5,094,799
[45] Date of Patent: Mar. 10, 1992

[54] PROCESS FOR PRODUCING BIAXIALLY ORIENTED NYLON FILM

[75] Inventors: Masao Takashige; Yuichi Ohki; Takeo Hayashi; Katsumi Utsuki; Masahiro Fujimoto, all of Himeji, Japan

[73] Assignee: Idemitsu Petrochemical Co., Ltd., Tokyo, Japan

[21] Appl. No.: 492,884

[22] Filed: Mar. 9, 1990

[30] Foreign Application Priority Data

| Mar. 10, 1989 | [JP] | Japan | 1-59414 |
| Oct. 13, 1989 | [JP] | Japan | 1-267564 |
| Oct. 16, 1989 | [JP] | Japan | 1-269835 |
| Nov. 15, 1989 | [JP] | Japan | 1-298396 |
| Feb. 16, 1990 | [JP] | Japan | 2-35861 |

[51] Int. Cl.⁵ ............... B29C 47/00; B29C 47/06; B29C 55/28
[52] U.S. Cl. .................. 264/514; 264/173; 264/209.5; 264/210.1; 264/235.8; 264/290.2; 264/564; 264/569
[58] Field of Search ........... 264/165, 173, 209.5, 264/210.1, 235.8, 290.2, 514, 564, 567, 566, 569

[56] References Cited

U.S. PATENT DOCUMENTS

| 3,788,503 | 1/1974 | Hirose et al. | 264/565 |
| 3,880,974 | 4/1975 | Nohtomi et al. | 264/569 X |
| 4,728,478 | 3/1988 | Sacks et al. | 264/514 |
| 4,734,245 | 3/1988 | Takashige et al. | 264/564 |
| 4,911,963 | 3/1990 | Lustig et al. | 264/564 X |

FOREIGN PATENT DOCUMENTS

| 49-47269 | 12/1974 | Japan . | |
| 53-15914 | 5/1978 | Japan . | |
| 57-41924 | 3/1982 | Japan . | |
| 59-29128 | 2/1984 | Japan | 264/564 |
| 61-22613 | 6/1986 | Japan . | |

Primary Examiner—Leo B. Tentoni
Attorney, Agent, or Firm—Flynn, Thiel, Boutell & Tanis

[57] ABSTRACT

The invention relates to processes for producing biaxially oriented single-layered and multilayered films. The biaxially oriented single-layered film receives stresses in the range of 500 kg/cm² to 1500 kg/cm² each in the machine and transverse directions of the film. The multilayered film receives stresses in the range of 300 kg/cm² to 1250 kg/cm² each in the machine and transverse directions of the film. Thus, the molding stability in biaxial orientation of a nylon film is improved and the thickness accuracy of a resulting film is improved.

11 Claims, 1 Drawing Sheet

PROCESS FOR PRODUCING BIAXIALLY ORIENTED NYLON FILM

BACKGROUND OF THE INVENTION

1. Field of the Invention

The present invention relates to a process for producing a biaxially oriented nylon single-layered or multilayered film. It can be used as food packaging, industrial material and the like.

2. Description of the Related Arts

A nylon film which has been simultaneously biaxially oriented by a tubular film process has superior features in that its mechanical and optical characteristics, such as a mechanical strength and transparency, are good.

A multilayered film of nylon 6 layer/polyvinylidene chloride layer (i.e., PVDC) is employed as a substrate which acts as a barrier to water. However, there has been a problem in that incinerating the multilayered film produces harmful chlorine gas, which causes acid rain which, in turn, causes environmental destruction. Thus, various multilayered nylon films which do not contain polyvinylidene chloride have been proposed as a substrate which do not cause environmental problems and also have a superior characteristic as a barrier to oxygen. Since, e.g., a multilayered film comprising a nylon layer, adhesive resin layer and polyolefin layer has superior thermal shrinkage characteristics as well as is a superior barrier, a demand that it be used for a fresh meat packaging film or the like has been expected. Hitherto, a process for stably producing such biaxially oriented nylon multilayered film has been required. In addition, a multilayered film of nylon 6 layer/ethylenevinyl acetate copolymeric saponification product (i.e., EVOH)/nylon 6 layer has been proposed and a process for stably producing this biaxially oriented multilayered film has been required.

In accordance with a prior-art tubular film process for producing a biaxially oriented nylon film, since the thickness accuracy of the resulting film is generally low, it has tended to have a poor winding appearance and produce defects in secondary processing of the film, e.g., a printing, lamination or bag-making, which has restricted food packaging and industrial uses of the film. This is because a thickness unevenness of a 2-6% order will appear even when an extrusion die adjusts the thickness accuracy of the film in producing a rollstock film to be oriented. In addition, the thickness unevenness will at least double during the progress of film drawing in accordance with the prior-art tubular film process and since the prior-art tubular film process could fail to stabilize a bubble under a film drawing operation, the bubble could rock and occasionally rupture.

Hitherto, in order to secure molding stability in a biaxial draw operation of a polyamide resin film, a process in which preheating is applied to the polyamide resin film before a biaxial drawing operation thereof (Unexamined Japanese Patent Application Publication No. 57-41924), a process in which a draw magnification is regulated (Examined Japanese Patent Application Publication No. 49-47269), a process in which a draw temperature is regulated (Examined Japanese Patent Application Publication No. 53-15914) and the like have been proposed. However, none of these processes could accurately regulate desirable process conditions.

In particular, since orientation stress in a film such as a multilayered film of nylon 6 layer/EVOH layer/nylon 6 layer is too high to continuously mold it in accordance with a process in which preheating is applied before biaxial drawing (Unexamined Japanese Patent Application Publication No. 57-41924), it is unpreferable.

Examined Japanese Patent Application Publication No. 49-47269 propose a process for producing a biaxially molecularly oriented poly-$\epsilon$-capramide resin film comprising the steps of: quenching and solidifying a tubular film made of a molten and extruded poly-$\epsilon$-capramide resin to obtain an essentially amorphous and hydrogen bond-free poly-$\epsilon$-capramide resin tubular film in a state of less than 2% water content; and performing tube drawing at a temperature of 45° to 70° C. inclusive before film drawing so that respective machine direction draw magnification and transverse direction draw magnification of the tube draw are in the ranges of 2.0 to 4.0.

Examined Japanese Patent Application Publication No. 53-1 5914 proposed a process for biaxially drawing a tubular polyamide film comprising the steps of: heating a nonoriented tubular polyamide film at a temperature of 50° to 90° C. inclusive; then holding an atmospheric temperature between a draw start point and draw completion point of 180° to 250° C. inclusive to fix the draw start point; and performing a simultaneous biaxial draw by gas pressure at a machine direction draw magnification of 2.5 to 3.7 and at a transverse direction draw magnification of 3.0 to 4.0 while restricting the final machine and transverse direction draw magnification differences to within the ranges of 0.2 to 0.6. However, such processes with the draw magnifications or draw temperature being controlled could not accurately regulate process conditions for producing a good film.

In addition, since nylon 6-66 is a resin having superior shrinkage characteristics and mechanical strength, processes for stably producing single-layered and multilayered nylon films made of nylon 6-66 for packaging film substrate, e.g., for animal meat or cheese has been demanded. In the meanwhile, when a polyvinylidene chloride resin, which has good shrinkage characteristics but low mechanical strength, is employed for packaging film substrate, a corresponding packaging film can be ruptured, especially in a cold chain.

In addition, since nylon 66 is a resin having good heat resistance and mechanical strength, a process for stably producing a monolayered or multilayered nylon film made of nylon 66 for retorted food and high-retorted food packaging film substrates has been demanded.

SUMMARY OF THE INVENTION

Objects of the Present Invention

Objects of the present invention are to provide processes for producing single-layered nylon films (i.e., nylon 6, nylon 66 and nylon 6-66 films) and a multilayered nylon film which are biaxially oriented in accordance with tubular film process, the processes being able to improve molding stabilities in biaxial drawing and provide good thickness accuracies of resulting films.

The objects of the present invention will be described in more detail hereinafter.

First Object of the Present Invention

The first object of the present invention is to provide a process for especially producing a biaxially oriented nylon 6 film out of biaxially oriented nylon films produced by a tubular film process so that a molding condition in drawing of the films is stabilized and the thickness accuracy of a resulting film is good.

In order to achieve the first object, various parameters characterizing drawing were confirmed by experiments of producing a nylon 6 film biaxially oriented by a tubular film process. These experiments showed that selecting process conditions in response to the maximal draw stress $\sigma_{MD}$ in the film's machine direction (MD) and maximal draw stress $\sigma_{TD}$ in the film's transverse direction (TD) provided a good result.

Accordingly, a preferable embodiment achieving the first object is characterized in that $\sigma_{MD}$ and $\sigma_{TD}$ are selected according to the following expressions:

$$600 \text{ kg/cm}^2 \leq \sigma_{MD} \leq 1,300 \text{ kg/cm}^2.$$

$$600 \text{ kg/cm}^2 \leq \sigma_{TD} \leq 1,300 \text{ kg/cm}^2.$$

When both $\sigma_{MD}$ and $\sigma_{TD}$ exceed 1,300 kg/cm$^2$, the bubble during drawing frequently ruptures so that the continuous production of the film fails to continue. On the other hand, when both $\sigma_{MD}$ and $\sigma_{TD}$ are less than 600 kg/cm$^2$, the bubble during drawing becomes unstable. Thus, it is more preferable that the upper limits of both $\sigma_{MD}$ and $\sigma_{TD}$ are selected to be 1,200 kg/cm$^2$ and the lower limits of both $\sigma_{MD}$ and $\sigma_{TD}$ are selected to be 700 kg/cm$^2$.

Second Object of the Present Invention

A second object of the present invention is to provide a process for especially producing a biaxially oriented nylon 66 film out of biaxially oriented nylon films produced by tubular film processes so that the molding condition during the drawing of the film is stabilized and the thickness accuracy of the resulting film is good.

In order to achieve the second object, various parameters characterizing drawing were confirmed by experiments of producing the nylon 66 film biaxially oriented by a tubular film process. These experiments showed that selecting process conditions in response to the maximal draw stress $\sigma_{MD}$ in the film's machine direction (MD) and maximal draw direction $\sigma_{TD}$ in the film's transverse direction (TD) provided a good result.

Accordingly, a preferable embodiment achieving the second object is characterized in that $\sigma_{MD}$ and $\sigma_{TD}$ are selected according to the following expressions:

$$700 \text{ kg/cm}^2 \leq \sigma_{MD} \leq 1,500 \text{ kg/cm}^2$$

$$700 \text{ kg/cm}^2 \leq \sigma_{TD} \leq 1,500 \text{ kg/cm}^2.$$

When both $\sigma_{MD}$ and $\sigma_{TD}$ exceed 1,500 kg/cm$^2$, the bubble during drawing frequently ruptures so that the continuous production of the film fails to continue. On the other hand, when both $\sigma_{MD}$ and $\sigma_{TD}$ are less than 700 kg/cm$^2$, the bubble during drawing becomes unstable. Thus, it is more preferable that the upper limits of both $\sigma_{MD}$ and $\sigma_{TD}$ are selected to be 1,400 kg/cm$^2$ and the lower limits of both $\sigma_{MD}$ and $\sigma_{TD}$ are selected to be 800 kg/cm$^2$.

Third Object of the Present Invention

The third object of the present invention is to provide a process for especially producing a biaxially oriented nylon 6-66 film out of biaxially oriented nylon films produced by tubular film processes so that the molding condition during the drawing of the film is stabilized and the thickness accuracy of the resulting film is good.

In order to achieve the third object, various parameters characterizing drawing were confirmed by experiments of producing the nylon 6-66 film biaxially oriented by a tubular film process. These experiments showed that selecting process conditions in response to the maximal draw stress $\sigma_{MD}$ in the film's machine direction (MD) and maximal draw stress $\sigma_{TD}$ in the film's transverse direction (TD) provided a good result.

Accordingly, a preferable embodiment achieving the third object is characterized in that $\sigma_{MD}$ and $\sigma_{TD}$ are selected according to the following expressions:

$$500 \text{ kg/cm}^2 \leq \sigma_{MD} \leq 1,100 \text{ kg/cm}^2.$$

$$500 \text{ kg/cm}^2 \leq \sigma_{TD} \leq 1,100 \text{ kg/cm}^2.$$

When both $\sigma_{MD}$ and $\sigma_{TD}$ exceed 1,100 kg/cm$^2$, the bubble during drawing frequently ruptures so that the continuous production of the film fails to continue. On the other hand, when both $\sigma_{MD}$ and $\sigma_{TD}$ are less than 500 kg/cm$^2$, the bubble during drawing becomes unstable. Thus, it is more preferable that the upper limits of both $\sigma_{MD}$ and $\sigma_{TD}$ are selected to be 1,000 kg/cm$^2$ and the lower limits of both $\sigma_{MD}$ and $\sigma_{TD}$ are selected to be 600 kg/cm$^2$.

Fourth Object of the Present Invention

The fourth object of the present invention is to provide a process for producing a multilayered film comprising a nylon 6 layer and an ethylene-vinyl acetate copolymeric saponification product (i.e., EVOH) layer which has a high permeability to oxygen and high mechanical strength. The process is able to improve molding stability during biaxial drawing and provide a good thickness accuracy of the resulting film.

In order to achieve the fourth object, various parameters characterizing drawing operation were confirmed by experiments of producing the multilayered film biaxially oriented by a tubular film process and comprising a nylon 6 layer and an EVOH layer. These experiments showed that selecting process conditions in response to the maximal draw stress $\sigma_{MD}$ in the film's machine direction (MD) and maximal draw stress $\sigma_{TD}$ in the film's transverse direction (TD) provided a good result.

Accordingly, a preferable embodiment achieving the fourth object is characterized in that $\sigma_{MD}$ and $\sigma_{TD}$ are selected according to the following expressions:

$$600 \text{ kg/cm}^2 \leq \sigma_{MD} \leq 1,250 \text{ kg/cm}^2.$$

$$600 \text{ kg/cm}^2 \leq \sigma_{TD} \leq 1,250 \text{ kg/cm}^2.$$

When both $\sigma_{MD}$ and $\sigma_{TD}$ exceed 1,250 kg/cm$^2$, the bubble during drawing frequently ruptures so that a continuous production of the film fails to continue. On the other hand, when both $\sigma_{MD}$ and $\sigma_{TD}$ are less than 600 kg/cm$^2$, the bubble during drawing becomes unstable. Thus, it is more preferable that the upper limits of both $\sigma_{MD}$ and $\sigma_{TD}$ are selected to be 1,100 kg/cm$^2$ and the lower limits of both $\sigma_{MD}$ and $\sigma_{TD}$ are selected to be 700 kg/cm$^2$.

Herein, the multilayered film comprising a nylon 6 layer and an EVOH layer includes, e.g., multilayered films respectively having a double-layer structure of nylon 6 layer/EVOH layer and a trilayer structure of nylon 6 layer/EVOH layer/nylon 6 layer.

Fifth Object of the Present Invention

In view of the maximal draw stress $\sigma_{MD}$ in a film's machine direction (MD) and maximal draw stress $\sigma_{TD}$ in a film's transverse direction (TD), both caused in a biaxially oriented multilayered film comprising nylon 6 layer, adhesive resin layer and polyolefin layer, the fifth object of the present invention is to define process conditions in response to the maximal draw stress $\sigma_{MD}$ in a film's machine direction (MD) and maximal draw stress $\sigma_{TD}$ in a film's transverse direction (TD).

For example, particular arrangements of this multilayered film are as follows: (i) a lamination of nylon 6/adhesive resin layer/polyolefin layer arranged in this order; (ii) a lamination of polyolefin layer/adhesive resin layer/nylon 6 layer/adhesive resin layer/polyolefin layer arranged in this order.

In order to achieve the fifth object, a preferable embodiment achieving the fifth object is characterized in that $\sigma_{MD}$ and $\sigma_{TD}$ are selected according to the following expressions:

$$400 \text{ kg/cm}^2 \leq \sigma_{MD} \leq 700 \text{ kg/cm}^2.$$

$$400 \text{ kg/cm}^2 \leq \sigma_{TD} \leq 700 \text{ kg/cm}^2.$$

It is more preferable that the upper limits of both $\sigma_{MD}$ and $\sigma_{TD}$ are selected to be 650 kg/cm² and the lower limits of both $\sigma_{MD}$ and $\sigma_{TD}$ are selected to be 450 kg/cm².

Particular polyolefins used in the polyolefin layer can comprise, e.g., polyethylene (i.e., PE), polypropylene (i.e., PP), ethylene-vinyl acetate copolymer (i.e., EVA), ionomer resin (i.e., IR), ethylene-acrylic acid copolymer (i.e., EAA), ethylene-ethyl acrylate copolymer (i.e., EEA), polybutene (i.e., PB), ethylene-methacrylic acid copolymer (i.e., EMAA) and etc. In view of heat-sealability, linear low-density polyethylene (i.e., L-LDPE), IR, EVA and EAA out of PE may be preferably employed.

A resin providing the adhesive resin layer may be selected if desired. A modified polyolefin resin, an EVA of a greater acetate content and the like may be used for this resin. In view of a low odor, the modified polyolefin resin out of these resins may be preferably employed.

Sixth Object of the Present Invention

In view of the maximal draw stress $\sigma_{MD}$ in a film's machine direction (MD) and maximal draw stress $\sigma_{TD}$ in a film's transverse direction (TD), both caused in a biaxially oriented multilayered film comprising a nylon 6 layer, an EVOH layer, adhesive resin layer and a polyolefin layer, the sixth object of the present invention is to define process conditions in response to the maximal draw stress $\sigma_{MD}$ in a film's machine direction (MD) and maximal draw stress $\sigma_{TD}$ in a film's transverse direction (TD).

For example, particular arrangements of this multilayered film are as follows: (i) a lamination of a nylon 6/EVOH layer/adhesive resin layer/polyolefin layer arranged in this order; (ii) a lamination of nylon 6 layer/EVOH layer/nylon 6 layer/adhesive resin layer/polyolefin layer arranged in this order; (iii) a lamination of an EVOH layer/nylon 6 layer/adhesive resin layer/polyolefin layer arranged in this order: (iv) a lamination of a polyolefin layer/adhesive resin layer/nylon 6 layer/EVOH layer/adhesive resin layer/polyolefin layer arranged in this order; and (v) a lamination of a polyolefin layer/adhesive resin layer/nylon 6 layer/EVOH layer/nylon 6 layer/adhesive resin layer/polyolefin layer arranged in this order.

In order to achieve the sixth object, a preferable embodiment achieving the sixth object is characterized in that $\sigma_{MD}$ and $\sigma_{TD}$ are selected according to the following expressions:

$$450 \text{ kg/cm}^2 \leq \sigma_{MD} \leq 850 \text{ kg/cm}^2.$$

$$450 \text{ kg/cm}^2 \leq \sigma_{TD} \leq 850 \text{ kg/cm}^2.$$

It is more preferable that the upper limits of both $\sigma_{MD}$ and $\sigma_{TD}$ are selected to be 750 kg/cm² and the lower limits of both $\sigma_{MD}$ and $\sigma_{TD}$ are selected to be 550 kg/cm².

Seventh Object of the Present Invention

In view of the maximal draw stress $\sigma_{MD}$ in a film's machine direction (MD) and maximal draw stress $\sigma_{TD}$ in a film's transverse direction (TD), both caused in a biaxially oriented multilayered film comprising a nylon 6-66 layer and an EVOH layer, the seventh object of the present invention is to define process conditions in response to the maximal draw stress $\sigma_{MD}$ in a film's machine direction (MD) and maximal draw stress $\sigma_{TD}$ in a film's transverse direction (TD).

For example, particular arrangements of this multilayered film are as follows: (i) a lamination of nylon 6-66 layer/EVOH layer; (ii) a lamination of nylon 6-66 layer/EVOH layer/nylon 6-66 layer arranged in this order: and (iii) a lamination of EVOH layer/nylon 6-66 layer/EVOH layer arranged in this order.

In order to achieve the seventh object, a preferable embodiment achieving the seventh object is characterized in that $\sigma_{MD}$ and $\sigma_{TD}$ are selected according to the following expressions:

$$500 \text{ kg/cm}^2 \leq \sigma_{MD} \leq 1,150 \text{ kg/cm}^2.$$

$$500 \text{ kg/cm}^2 \leq \sigma_{TD} \leq 1,150 \text{ kg/cm}^2.$$

It is more preferable that the upper limits of both $\sigma_{MD}$ and $\sigma_{TD}$ are selected to be 1,000 kg/cm² and the lower limits of both $\sigma_{MD}$ and $\sigma_{TD}$ are selected to be 600 kg/cm².

Eighth Object of the Present Invention

In view of the maximal draw stress $\sigma_{MD}$ in a film's machine direction (MD) and maximal draw stress $\sigma_{TD}$ in a film's transverse direction (TD), both caused in a biaxially oriented multilayered film comprising a nylon 6-66 layer, an EVOH layer, an adhesive resin layer and a polyolefin layer, the eighth object of the present invention is to define process conditions in response to the maximal draw stress $\sigma_{MD}$ in a film's machine direction (MD) and maximal draw stress $\sigma_{TD}$ in a film's transverse direction (TD).

For example, particular arrangements of this multilayered film are as follows: (i) a lamination of a nylon 6-66 layer/EVOH layer/adhesive resin layer/polyolefin layer arranged in this order; (ii) a lamination of a nylon 6-66 layer/EVOH layer/nylon 6-66 layer/adhesive resin layer/polyolefin layer arranged in this order; (iii) a lamination of an EVOH layer/nylon 6-66 layer/adhesive resin layer/polyolefin layer arranged in this order; (iv) a lamination of a polyolefin layer/adhesive resin layer/nylon 6-66 layer/EVOH layer/adhesive resin layer/polyolefin layer arranged in this order; and (v) a lamination of a polyolefin layer/adhesive resin layer/nylon 6-66 layer/EVOH layer/nylon 6-66 layer-/adhesive layer/polyolefin layer arranged in this order.

In order to achieve the eighth object, a preferable embodiment achieving the eighth object is characterized in that $\sigma_{MD}$ and $\sigma_{TD}$ are selected according to the following expressions:

$$350 \text{ kg/cm}^2 \leq \sigma_{MD} \leq 750 \text{ kg/cm}^2.$$

$$350 \text{ kg/cm}^2 \leq \sigma_{TD} \leq 750 \text{ kg/cm}^2.$$

It is more preferable that the upper limits of both $\sigma_{MD}$ and $\sigma_{TD}$ are selected to be 650 kg/cm² and the lower limits of both $\sigma_{MD}$ and $\sigma_{TD}$ are selected to be 450 kg/cm².

Ninth Object of the Present Invention

In view of the maximal draw stress $\sigma_{MD}$ in a film's machine direction (MD) and maximal draw stress $\sigma_{TD}$ in a film's transverse direction (TD), both caused in a biaxially oriented multilayered film comprising a nylon 6-66 layer, an adhesive resin layer and a polyolefin layer, the ninth object of the present invention is to define process conditions in response to the maximal draw stress $\sigma_{MD}$ in a film's machine direction (MD) and maximal draw stress $\sigma_{TD}$ in a film's transverse direction (TD).

For example, particular arrangements of this multilayered film are as follows: (i) a lamination of a nylon 6-66 layer/adhesive resin layer/polyolefin layer arranged in this order; and (ii) a lamination of a polyolefin layer/adhesive resin layer/nylon 6-66 layer/adhesive resin layer/polyolefin layer arranged in this order.

In order to achieve the ninth object, a preferable embodiment achieving the ninth object is characterized in that $\sigma_{MD}$ and $\sigma_{TD}$ are selected according to the following expressions:

$$300 \text{ kg/cm}^2 \leq \sigma_{MD} \leq 600 \text{ kg/cm}^2.$$

$$300 \text{ kg/cm}^2 \leq \sigma_{TD} \leq 600 \text{ kg/cm}^2.$$

It is more preferable that the upper limits of both $\sigma_{MD}$ and $\sigma_{TD}$ are selected to be 550 kg/cm² and the lower limits of both $\sigma_{MD}$ and $\sigma_{TD}$ are selected to be 350 kg/cm².

In accordance with the present invention, $\sigma_{MD}$ and $\sigma_{TD}$ are expressed by the following equations (1) and (2):

$$\sigma_{MD} = (F \times B_{MD})/A, \quad F = T/r \quad (1),$$

wherein F represents a draw force (kg), $B_{MD}$ represents a draw magnification in the machine direction (MD), A represents a sectional area (cm²) of a rollstock film, T represents a torque (kgcm) of each of a pair of nip rolls, and r represents a radius (cm) of each of the pair of nip rolls. Computing the torque T from the reading of a load on a motor required to rotate the nip rolls provides the value of the draw force F in accordance with the equation (1).

$$\sigma_{TD} = (\Delta P \times R)/t \quad (2),$$

wherein $\Delta P$ represents an in-bubble pressure (kg/cm²), R represents a bubble radius (cm), and t represents a film thickness (cm). A measurement with a digital manometer provides the value of the in-bubble pressure $\Delta P$. The expression of a rollstock film thickness/(MD draw magnification × TD draw magnification) provides a computation value of the film thickness t.

DETAILED DESCRIPTION OF THE PREFERRED EMBODIMENTS

Figure 1:
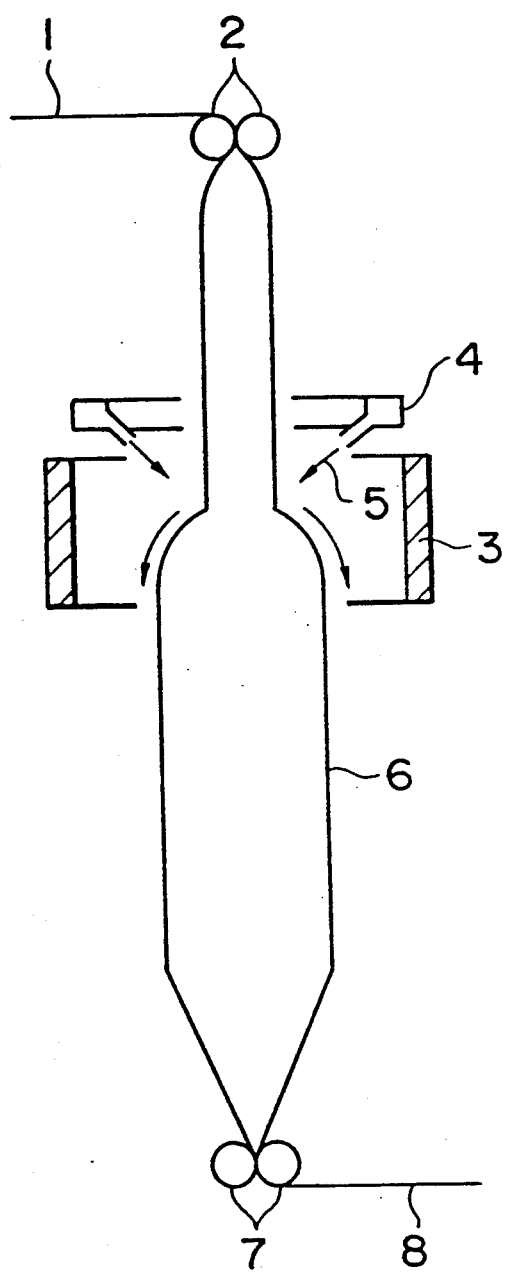
FIG. 1 is a schematic illustration of an apparatus used in a production process of each embodiment of the present invention.

Hereinafter, a first embodiment of the present invention achieving the first object of the present invention will be described with reference to FIG. 1.

EXPERIMENTAL EXAMPLE 1

An annular die with a 75 mm diameter extruded nylon 6 with a 3.7 relative viscosity $\eta_r$, in particular, UBE nylon 1024FD (Trademark, produced by Ube Industries, Ltd., having a 3.7 relative viscosity $\eta_r$). Then, the extruded nylon 6 was cooled in a cooling cistern at a water temperature of 15° C. to produce tubular rollstock film 1 of a 120 micrometer thickness. Then, the rollstock film 1 was nipped between a pair of nip rolls 2 as shown in FIG. 1. Then, the hollow interior of the rollstock film 1 was forcibly blown with a gas, and a heater 3 at 310° C. concurrently heated the rollstock film 1. An air ring 4 concurrently blew 15 m³/min air 5 to the draw start point of the rollstock film 1 to expand the rollstock film 1 in the form of a bubble 6. A pair of nip rolls 7 positioned downstream of the bubble 6 drew up the bubble 6. Thus, a simultaneous biaxial drawing was performed to produce a biaxially oriented nylon 6 film 8. The draw magnification in the film's machine direction (MD) was 3.0 and the draw magnification in the film's transverse direction (TD) was 3.2.

In the simultaneous biaxial drawing operation, the pressure in the bubble 6, radius of the bubble 6, rotational speed of each of the pairs of nip rolls 2 and nip rolls 7, and load on and torque of a drive motor were selected to be particular values thereby to adjust the maximal draw stress $\sigma_{MD}$ in the film's machine direction (MD) and maximal draw stress $\sigma_{TD}$ in the film's transverse direction (TD) of the resulting film.

In accordance with Experimental Example 1, the maximal draw stress $\sigma_{MD}$ in the film's machine direction (MD) was 950 kg/cm² and the maximal draw stress $\sigma_{TD}$ in the film's transverse direction (TD) was 960 kg/cm².

These $\sigma_{MD}$ and $\sigma_{TD}$ were computed by equations (1) and (2) wherein T = [97,450 × (I − I) × 0.22]/N wherein I represents motor current (A) in load operation, $I_0$ represents motor current (A) in no-load operation and N represents a rotational speed (rpm) of each of the nip rolls. The above specified value of torque T represents that of a particular nip roll of Experimental Example 1.

In the production of the biaxially oriented nylon 6 film according to Experimental Example 1 with $\sigma_{MD}$ and $\sigma_{TD}$ selected to be the above values, 24-hr continuous production of the film resulted in no bubble 6 being drawn experiencing a rocking etc. The thickness accuracy of the resulting nylon 6 film 8 was very good as 4% in thickness unevenness.

EXPERIMENTAL EXAMPLES 2 TO 10

A biaxially oriented nylon 6 film 8 of each of Experimental Examples 2 to 10 was produced as that of Experimental Example 1. However, the MD draw magnifications, TD draw magnifications, air capacities of the air ring 4, and selected temperatures of the heater 3 were different among Experimental Examples 2 to 10 as shown on Table 1.

An MD draw magnification of each of Experimental Examples 2 to 8 and 10 was 3.0 and that of Experimental Example 9 was 3.4.

A TD draw magnification of each of Experimental Examples 2 to 6, 9 and 10 was 3.2, that of Experimental Example 7 was 3.0 and that of Experimental Example 8 was 3.4.

An air capacity of the air ring 4 of each of Experimental Examples 2, 3 and 7 to 10 was 15 m³/min, that of Experimental Example 4 was 5 m³/min and that of Experimental Example 6 was 45 m³/min.

A selected temperature of the heater 3 of Experimental Example 2 was 330° C., that of Experimental Example 3 was 280° C., that of each of Experimental Examples 4 to 9 was 310° C. and that of Experimental Example 10 was 370° C.

A temperature of a cooling water of each of Experimental Examples 2 to 10 was 15° C.

In each of Experimental Examples 2 to 10, the pressure in a bubble 6, radius of the bubble 6, rotational speed of each of the pairs of nip rolls 2 and nip rolls 7, and load on and torque of the drive motor were selected to be particular values during the simultaneous drawing operation so that the maximal draw stress $\sigma_{MD}$ in the film's machine direction (MD) and the maximal draw stress $\sigma_{TD}$ in the film's transverse direction (TD) essentially equaled the same adequate value.

In the production of a biaxially oriented nylon 6 film 8 of each Experimental Example with $\sigma_{MD}$ and $\sigma_{TD}$ selected to be respective suitable values, 24-hr continuous production was performed, the molding stability of a bubble 6 during the drawing operation was watched and evaluated, and the thickness unevenness, i.e., thickness accuracy of the resulting biaxially oriented nylon 6 film 8 was measured and evaluated. In addition, the biaxially oriented nylon 6 film 8 was generally evaluated. The below Table 1 shows all of the results of the study, particular evaluations and general evaluations.

CONTROL EXAMPLES 1 TO 8

A biaxially oriented nylon film of each of Control Examples or Controls 1 to 8 was produced as in each of Experimental Examples 1 to 10. However, MD draw magnifications, TD draw magnifications, air capacities of the air ring 4, selected temperatures of the heater 3 and temperatures of cooling water were different between Control Examples 1 to 8 as shown in Table 1.

The MD draw magnification of each of Control Examples 1 to 4 and 8 was 3.0, that of Control Example 5 was 3.6, that of Control Example 6 was 2.4 and that of Control Example 7 was 3.4.

The TD draw magnification of each of Control Examples 1 to 6 and 8 was 3.2 and that of Control Example 7 was 3.4.

The air flow through the air ring 4 of each of Control Examples 1, 2 and 5 to 8 was 15 m³/min, that of Control Example 3 was 0 m³/min and that of Control Example 4 was 55 m³/min.

The selected temperature of the heater 3 of Control Example 1 was 400° C., that of Control Example 2 was 260° C. and that of each of Control Examples 3 to 8 was 310° C.

The temperature of the cooling water of each of Control Examples 1 to 7 was 15° C. and that of Control Example 8 was 45° C.

In each of Control Examples 1 to 8, as in Experimental Examples 1 to 10, the pressure in the bubble 6, radius of the bubble 6, etc. were selected to be particular values during the simultaneous drawing operation so that the maximal draw stress $\sigma_{MD}$ in the film's machine direction (MD) and the maximal draw stress $\sigma_{TD}$ in the film's transverse direction (TD) essentially equaled the same adequate value.

In the production of a biaxially oriented nylon 6 film of each Control Example with $\sigma_{MD}$ and $\sigma_{TD}$ selected to be respective adequate values, 24-hr continuous production was performed, the molding stability of the bubble 6 being drawn was watched and evaluated, and the thickness accuracy of the resulting biaxially oriented nylon 6 film was measured and evaluated. In addition, the biaxially oriented nylon 6 film was generally evaluated. The below Table 1 shows all of the results of the study, particular evaluations and general evaluations.

In Table 1, a legend ⊙ in the molding stability column indicates a condition that a lay flat width variation in the bubble is within 1%, no rupture in the bubble occurs and no unstable phenomenon, e.g., a vertical motion and a rocking occur; a legend ◯ in the molding stability column indicates a condition that a lay flat width variation in bubble is within 3%, no rupture in bubble occurs and no unstable phenomenon occurs; and a legend x in the molding stability column indicates a condition that the bubble is ruptured or unstable phenomenon occurs, which makes the continuous molding of the film difficult. Respective legends ◯, Δ and x in the thickness accuracy column respectively indicate conditions with local thicknesses of 6% or less, an addition or subtraction 7 to 10% and an addition or subtraction 11% or more. A legend ⊙ in the general evaluation column indicates optimum for industrial production, a legend ◯ therein indicates favorability to industrial production, and legend x indicates incapable of industrial production.

TABLE 1

| | Draw magni. | | Air capacity | Heater | Cooling water | $\sigma_{MD}$ | $\sigma_{TD}$ | Molding | Thickness | |
| | MD | TD | (m³/min) | (°C.) | (°C.) | (kg/cm²) | (kg/cm²) | stability | accuracy | G.E. |
|---|---|---|---|---|---|---|---|---|---|---|
| Ex. Ex. 1 | 3.0 | 3.2 | 15 | 310 | 15 | 950 | 960 | ⊙ | ±4% ◯ | ⊙ |
| Ex. Ex. 2 | 3.0 | 3.2 | 15 | 330 | 15 | 820 | 830 | ◯ | ±5% ◯ | ◯ |
| Ex. Ex. 3 | 3.0 | 3.2 | 15 | 280 | 15 | 1050 | 1100 | ⊙ | ±3% ◯ | ⊙ |
| Ex. Ex. 4 | 3.0 | 3.2 | 5 | 310 | 15 | 760 | 765 | ◯ | ±6% ◯ | ◯ |
| Ex. Ex. 5 | 3.0 | 3.2 | 10 | 310 | 15 | 820 | 830 | ◯ | ±5% ◯ | ◯ |
| Ex. Ex. 6 | 3.0 | 3.2 | 45 | 310 | 15 | 1030 | 1080 | ⊙ | ±3% ◯ | ⊙ |
| Ex. Ex. 7 | 3.0 | 3.0 | 15 | 310 | 15 | 740 | 750 | ⊙ | ±6% ◯ | ◯ |
| Ex. Ex. 8 | 3.0 | 3.4 | 15 | 310 | 15 | 990 | 1040 | ◯ | ±4% ◯ | ◯ |
| Ex. Ex. 9 | 3.4 | 3.2 | 15 | 310 | 15 | 1180 | 1140 | ◯ | ±4% ◯ | ◯ |
| Ex. Ex. 10 | 3.0 | 3.2 | 15 | 370 | 15 | 630 | 640 | Δ | ±8% Δ | Δ |
| Con. Ex. 1 | 3.0 | 3.2 | 15 | 400 | 15 | 480 | 490 | X unsta. | ±15% X | X |

TABLE 1-continued

| | Draw magni. | | Air capacity | Heater | Cooling water | $\sigma_{MD}$ | $\sigma_{TD}$ | Molding | Thickness | |
| | MD | TD | (m³/min) | (°C.) | (°C.) | (kg/cm²) | (kg/cm²) | stability | accuracy | G.E. |
|---|---|---|---|---|---|---|---|---|---|---|
| Con. Ex. 2 | 3.0 | 3.2 | 15 | 260 | 15 | 1320 | 1340 | X rup. | ±4% ○ | X |
| Con. Ex. 3 | 3.0 | 3.2 | 0 | 310 | 15 | 520 | 530 | X unsta. | ±14% X | X |
| Con. Ex. 4 | 3.0 | 3.2 | 55 | 310 | 15 | 1350 | 1380 | X rup. | ±5% ○ | X |
| Con. Ex. 5 | 3.6 | 3.2 | 15 | 310 | 15 | 1380 | 1410 | X rup. | ±8% △ | X |
| Con. Ex. 6 | 2.4 | 3.2 | 15 | 310 | 15 | 480 | 530 | X rock. | ±5% ○ | X |
| Con. Ex. 7 | 3.4 | 3.4 | 15 | 310 | 15 | 1360 | 1350 | X rup. | ±4% ○ | X |
| Con. Ex. 8 | 3.0 | 3.2 | 15 | 310 | 45 | 1400 | 1420 | X rup. | ±4% ○ | X |

Ex. Ex.: Experimental Example; unsta.: unstable
Con. Ex.: Control Example; rup.: rupture
Draw magni.: Draw magnification; rock.: rocking
Molding sta.: Molding stability; G.E.: General evaluation Table 1 indicates that in accordance with Experimental Examples 1 to 10 and Control Examples 1 to 8, when both the maximal draw stress $\sigma_{MD}$ in the film's machine direction (MD) and maximal draw stress $\sigma_{TD}$ in the film's transverse direction (TD) are in the range of 600 kg/cm² to 1,300 kg/cm², good molding stability of the bubble 6 and good thickness accuracy of the biaxially oriented nylon 6 film 8 are provided. In particular, it is more preferable that the upper limits of both $\sigma_{MD}$ and $\sigma_{TD}$ are 1,200 kg/cm² and the lower limits thereof are 700 kg/cm².

Consequently, since this first embodiment provides a good molding stability in the biaxial drawing of the nylon 6 film, the film is smoothly and continuously produced. In addition, the thickness accuracy of the resulting biaxially oriented nylon 6 film is improved to provide a quality product.

Hereinafter, a second embodiment of the present invention achieving the second object of the present invention will be derived with reference to FIG. 1 as in the first embodiment. The descriptions of the same or similar arrangements as those of the first embodiment will be eliminated or abridged.

EXPERIMENTAL EXAMPLE 11

The extruder having a screw with a 40 mm diameter extruded a nylon 66 with a 3.6 relative viscosity $\eta_r$ (produced by Ube Industries, Ltd.) which had been melted at 290° C. in the extruder. Then, the extruded nylon 66 was cooled by the water cooling ring 4 at a water temperature of 15° C. to produce a tubular rollstock film 1 with a 90 mm diameter and a 125 micrometer thickness.

Then, the rollstock film 1 was nipped between the pair of nip rolls 2 as shown in FIG. 1. Then, the hollow interior of the rollstock film 1 was forcibly blown with the gas and the heater 3, at a selected temperature of 290° C., concurrently heated the rollstock film 1. The air ring 4 concurrently blew 15 m³/min of air 5 to the draw start point of the rollstock film 1 to expand the rollstock film 1 in the form of a bubble 6. The pair of nip rolls 7 positioned downstream of the bubble 6 drew up the bubble 6. Thus, a simultaneous biaxial drawing operation was performed. The draw magnification in the film's machine direction (MD) was 2.8 and the draw magnification in the film's transverse direction (TD) was 3.2.

In the simultaneous biaxial drawing operation, the pressure in the bubble 6, radius of the bubble 6, rotational speed of each of the pairs of nip rolls 2 and nip rolls 7, and load on and torque of the drive motor were selected to be particular values to thereby adjust the maximal draw stress $\sigma_{MD}$ in the film's machine direction (MD) and the maximal draw stress $\sigma_{TD}$ in the film's transverse direction (TD) of the resulting film.

In accordance with Experimental Example 11, the maximal draw stress $\sigma_{MD}$ in the film's machine direction (MD) was 880 kg/cm² and the maximal draw stress $\sigma_{TD}$ in the film's transverse direction (TD) was 960 kg/cm².

These $\sigma_{MD}$ and $\sigma_{TD}$ were computed by equations (1) and (2) wherein F=110 kg, $B_{MD}$=2.8, A=0.35 cm², T=550 k/gcm, r=5 cm, P=934×10⁻⁴ kg/cm², R=14.4 cm and t=14.0×10⁻⁴ cm.

In the production of the biaxially oriented nylon 66 film of Experimental Example 11 with $\sigma_{MD}$ and $\sigma_{TD}$ selected to be the above values, 24-hr continuous production of the film resulted in no bubble 6 being drawn experiencing a rocking etc. and the bubble 6 was stable. The thickness accuracy of the resulting biaxially oriented nylon 66 film 8 was very good as 3% in thickness unevenness.

EXPERIMENTAL EXAMPLES 12 TO 17

Biaxially oriented nylon 66 films 8 of Experimental Examples 12 to 17 were produced as in Experimental Example 11. However, MD draw magnifications, TD draw magnifications, air capacities of the air ring 4 and selected temperatures of the heater 3 were different among Experimental Examples 12 to 17 as shown in Table 2.

In each of Experimental Examples 12 to 17, the pressure in the bubble 6, radius of the bubble 6, rotational speed of each of the pairs of nip rolls 2 and nip rolls 7, and load on and torque of the drive motor were selected to be particular values in the simultaneous drawing operation so that the maximal draw stress $\sigma_{MD}$ in the film's machine direction (MD) and the maximal draw stress $\sigma_{TD}$ in the film's transverse direction (TD) equaled essentially the same adequate value.

In the production of a biaxially oriented nylon 66 film 8 of each Experimental Example with $\sigma_{MD}$ and $\sigma_{TD}$ selected to be respective adequate values, 24-hr continuous production was performed, the molding stability of the bubble 6 being drawn was watched and evaluated, and the thickness unevenness, i.e., thickness accuracy of a resulting biaxially oriented nylon 66 film 8 was measured and evaluated. In addition, the biaxially oriented nylon 66 film 8 was generally evaluated. The below Table 2 shows all of the results of the study, particular evaluations and general evaluations.

CONTROL EXAMPLES 9 TO 14

Biaxially oriented nylon 66 films of Control Examples 9 to 14 were produced as in Experimental Examples 11 to 17. However, MD draw magnifications, TD draw magnifications, air capacities of the air ring 4, selected temperatures of the heater 3 and temperatures of the cooling water were different between Control Examples 9 to 14 as shown on Table 2.

In each of Control Examples 9 to 14, the pressure in the bubble 6, radius of the bubble 6, etc. were selected to be particular values during the simultaneous drawing operation as in Experimental Examples 11 to 17 so that $\sigma_{MD}$ and $\sigma_{TD}$ equaled essentially the same adequate value.

In the production of a biaxially oriented nylon 66 film of each Control Example, with $\sigma_{MD}$ and $\sigma_{TD}$ selected to be respective adequate values, 24-hr continuous production was performed, the molding stability of the bubble 6 being drawn was watched and evaluated, and the thickness accuracy of the resulting biaxially oriented nylon 66 film was measured and evaluated. In addition, the biaxially oriented nylon 66 film was generally evaluated. The below Table 2 shows all of the results of the study, particular evaluations and general evaluations.

Legends ⊚, ○, Δ and x used in the below Table 2 have the same meanings as those of Table 1.

TABLE 2

| | Draw magni. | | Air capacity | Heater | Cooling water | Draw stress | | Molding | Thickness | |
|---|---|---|---|---|---|---|---|---|---|---|
| | MD | TD | (m³/min) | (°C.) | (°C.) | σ MD | σ TD | stability | accuracy | G.E. |
| Ex. Ex. 11 | 2.8 | 3.2 | 15 | 290 | 15 | 880 | 960 | ⊚ | ±3% ○ | ⊚ |
| Ex. Ex. 12 | 2.6 | 3.2 | 15 | 290 | 15 | 760 | 840 | ○ | ±4% ○ | ○ |
| Ex. Ex. 13 | 3.0 | 3.2 | 15 | 290 | 15 | 1170 | 1130 | ⊚ | ±4% ○ | ⊚ |
| Ex. Ex. 14 | 2.8 | 3.2 | 15 | 340 | 15 | 750 | 810 | ○ | ±5% ○ | ○ |
| Ex. Ex. 15 | 2.8 | 3.2 | 15 | 260 | 15 | 1020 | 1090 | ⊚ | ±4% ○ | ⊚ |
| Ex. Ex. 16 | 2.8 | 3.2 | 15 | 230 | 15 | 1310 | 1340 | ⊚ | ±3% ○ | ⊚ |
| Ex. Ex. 17 | 3.1 | 3.2 | 15 | 290 | 15 | 1420 | 1430 | ○ | ±5% ○ | ○ |
| Con. Ex. 9 | 2.8 | 3.2 | 15 | 400 | 15 | 620 | 590 | X unsta. | ±12% X | X |
| Con. Ex. 10 | 2.8 | 3.2 | 15 | 200 | 15 | 1610 | 1580 | X rup. | ±4% ○ | X |
| Con. Ex. 11 | 3.2 | 3.2 | 15 | 290 | 15 | 1560 | 1530 | X rup. | ±8% Δ | X |
| Con. Ex. 12 | 2.8 | 3.2 | 0 | 290 | 15 | 600 | 630 | X unsta. | ±15% X | X |
| Con. Ex. 13 | 2.2 | 3.2 | 15 | 290 | 15 | 560 | 540 | X rock. | ±11% X | X |
| Con. Ex. 14 | 3.0 | 3.2 | 15 | 290 | 40 | 1650 | 1610 | X rup. | ±8% Δ | X |

Table 2 indicates that in accordance with Experimental Examples 11 to 17, since both the maximal draw stress $\sigma_{MD}$ in the film's machine direction (MD) and the maximal draw stress $\sigma_{TD}$ in the film's transverse direction (TD) are in the range of 700 kg/cm² to 1,500 kg/cm², good molding stability of the bubble 6 and good thickness accuracy of the biaxially oriented nylon 66 film 8 are provided. In particular, each of Experimental Examples 11, 13, 15 and 16, with $\sigma_{MD}$ and $\sigma_{TD}$ selected to be in the range of 800 kg/cm², to 1,400 kg/cm² provides better molding stability and thickness accuracy.

On the other hand, Table 2 also indicates that since both $\sigma_{MD}$ and $\sigma_{TD}$ of each of Control Examples 9, 12 and 13 are less than 700 kg/cm² and both $\sigma_{MD}$ and $\sigma_{TD}$ of each of Control Examples 10, 11 and 14 exceed 1,500 kg/cm², at least one of molding stability and thickness accuracy is defective.

Consequently, since this second embodiment provides good molding stability during biaxial drawing of the nylon 66 film, the film is smoothly and continuously produced. In addition, the thickness accuracy of the resulting biaxially oriented nylon 66 film is improved to provide a quality product.

Hereinafter, a third embodiment of the present invention achieving the third object of the present invention will be described with reference to FIG. 1 is the first and second embodiments. The descriptions of the same or similar arrangements as those of each of the first and second embodiments will be eliminated or abridged.

EXPERIMENTAL EXAMPLE 18

An extruder having a screw with a 40 mm diameter extruded a nylon 6-66 with a 3.6 relative viscosity $\eta_r$, in particular, UBE nylon 5023 FD (Trademark, produced by Ube Industries, Ltd., having a 3.6 relative viscosity $\eta_r$) consisting of 85 mol % nylon 6 and 15 mol % nylon 66.

Then, the rollstock film 1 was nipped between a pair of nip rolls 2. Then, the hollow interior of the rollstock film 1 was forcibly blown with a gas, and a heater 3 at 290° C. concurrently heated the rollstock film 1. An air ring 4 concurrently blew 15 cm³/min air 5 to the draw start point of the rollstock film 1 to expand the rollstock film 1 in the form of a bubble 6. A pair of nip rolls 7 positioned downstream of the bubble 6 drew up the bubble 6. Thus, a simultaneous biaxial drawing operation was performed to produce a biaxially oriented nylon 6-66 film 8. The draw magnification in the film's machine direction (MD) was 3.1 and the draw magnification in the film's transverse direction (TD) was 3.2.

After the simultaneous biaxial drawing operation, the resulting biaxially oriented film was thermally fixed at 150° C.

In the simultaneous biaxial drawing operation, the pressure in the bubble 6, radius of the bubble 6, rotational speed of each of the pairs of nip rolls 2 and nip rolls 7, and load on and torque of a drive motor were selected to be particular values to thereby adjust the maximal draw stress $\sigma_{MD}$ in the film's machine direction (MD) and maximal draw stress $\sigma_{TD}$ in the film's transverse direction (TD) of the resulting film.

In accordance with Experimental Example 18, the maximal draw stress $\sigma_{MD}$ in the film's machine direction (MD) was 780 kg/cm² and the maximal draw stress $\sigma_{TD}$ in the film's transverse direction (TD) was 810 kg/cm².

These $\sigma_{MD}$ and $\sigma_{TD}$ were computed by the equations (1) and (2).

In the production of the biaxially oriented nylon 6-66 film according to Experimental Example 18 with $\sigma_{MD}$ and $\sigma_{TD}$ selected to be the above values, 24-hr continuous production of the film resulted in no bubble 6 being drawn experiencing a rocking etc. The thickness accuracy of the resulting biaxially oriented nylon 6-66 film 8 was good as 3.5% in thickness unevenness and the shrinkage ratio of this film 8 was 30% in a 95° C. hot water, which provided a good balance between the thickness accuracy and shrinkage ratio.

EXPERIMENTAL EXAMPLES 19 TO 24

Biaxially oriented nylon 6-66 film 8 of Experimental Examples 19 to 24 were produced as in Experimental Example 18. However, the MD draw magnifications, TD draw magnifications, air capacities of the air ring 4 and selected temperatures of the heater 3 were different among Experimental Examples 19 to 24 as shown on Table 3 provided hereinbelow.

In each of Experimental Examples 19 to 24, the pressure in bubble 6, radius of the bubble 6, rotational speed of each of the pairs of nip rolls 2 and nip rolls 7, and load on and torque of the drive motor were selected to be particular values in the simultaneous drawing operation so that the maximal draw stress $\sigma_{MD}$ in the film's machine direction (MD) and the maximal draw stress $\sigma_{TD}$ in the film's transverse direction (TD) essentially equaled the same adequate value.

In the production of a biaxially oriented nylon 6-66 film 8 of each Experimental Example with $\sigma_{MD}$ and $\sigma_{TD}$ selected to be respective adequate values, 24-hr continuous production was performed, the molding stability of the bubble 6 being drawn was watched and evaluated, and the thickness unevenness, i.e., thickness accuracy of the resulting biaxially oriented nylon 6-66 film 8 was measured and evaluated. In addition, the biaxially oriented nylon 6-66 film 8 was generally evaluated. The below Table 3 shows all of the results of the study, particular evaluations and general evaluations.

CONTROL EXAMPLES 15 TO 19

Biaxially oriented nylon 6-66 films 8 of Control Examples 15 to 19 were produced as in Experimental Examples 18 to 24. However, the MD draw magnifications, TD draw magnifications, air capacities of the air ring 4, selected temperatures of the heater 3 and temperatures of cooling water were different among Control Examples 15 to 19 as shown on Table 3 provided hereinbelow.

In each of Control Examples 15 to 19, the pressure in bubble 6, radius of the bubble 6 etc. were selected to be particular values in the simultaneous drawing operation so that the maximal draw stress $\sigma_{MD}$ in the film's machine direction (MD) and the maximal draw stress $\sigma_{TD}$ in the film's transverse direction (TD) essentially equaled the same suitable value.

In the production of a biaxially oriented nylon 6-66 film 8 of each Control Example with $\sigma_{MD}$ and $\sigma_{TD}$ selected to be respective adequate values, a 24-hr continuous production was performed, the molding stability of the bubble 6 being drawn was watched and evaluated, and the thickness accuracy of the resulting biaxially oriented nylon 6-66 film 8 was measured and evaluated. In addition, the biaxially oriented nylon 6-66 film 8 was generally evaluated. The below Table 3 shows all of the results of the study, particular evaluations and general evaluations.

Legends ⊚, ○, Δ and x used in the below Table 3 have the same meanings as those of Table 1.

TABLE 3

| | Draw magni. | | Air capacity | Heater | Cooling water | Draw stress | | Molding | Thickness | |
| --- | --- | --- | --- | --- | --- | --- | --- | --- | --- | --- |
| | MD | TD | (m³/min) | (°C.) | (°C.) | σ MD | σ TD | stability | accuracy | G.E. |
| Ex. Ex. 18 | 3.1 | 3.2 | 15 | 290 | 15 | 780 | 810 | ⊚ | ±3.5% ○ | ⊚ |
| Ex. Ex. 19 | 3.0 | 3.2 | 15 | 290 | 15 | 610 | 620 | ⊚ | ±5% ○ | ⊚ |
| Ex. Ex. 20 | 2.6 | 3.2 | 15 | 290 | 15 | 550 | 540 | ○ | ±6% ○ | ○ |
| Ex. Ex. 21 | 3.4 | 3.2 | 15 | 290 | 15 | 870 | 880 | ⊚ | ±3.5% ○ | ⊚ |
| Ex. Ex. 22 | 3.0 | 3.2 | 15 | 300 | 15 | 570 | 550 | ○ | ±5% ○ | ○ |
| Ex. Ex. 23 | 3.0 | 3.2 | 15 | 270 | 15 | 810 | 820 | ⊚ | ±3% ○ | ⊚ |
| Ex. Ex. 24 | 3.0 | 3.2 | 15 | 240 | 15 | 1050 | 1080 | ○ | ±4% ○ | ○ |
| Con. Ex. 15 | 3.0 | 3.2 | 15 | 360 | 15 | 420 | 430 | X unsta. | ±11% X | X |
| Con. Ex. 16 | 3.0 | 3.2 | 15 | 220 | 15 | 1250 | 1270 | X rup. | ±4% ○ | X |
| Con. Ex. 17 | 3.2 | 3.2 | 15 | 290 | 15 | 380 | 370 | X rock. | ±13% Δ | X |
| Con. Ex. 18 | 3.2 | 3.2 | 15 | 270 | 15 | 1110 | 1130 | X rup. | ±5% X | X |
| Con. Ex. 19 | 3.8 | 3.2 | 15 | 290 | 40 | 1150 | 1140 | X rup. | ±8.5% Δ | X |

Table 3 indicates that in accordance with Experimental Examples 18 to 24, since both the maximal draw stress $\sigma_{MD}$ in the film's machine direction (MD) and maximal draw stress $\sigma_{TD}$ in the film's transverse direction (TD) are in the range of 500 kg/cm² to 1,100 kg/cm², a good molding stability of the bubble 6 being drawn and good thickness accuracy of the biaxially oriented nylon 6-66 film 8 are provided. In particular, each of Experimental Examples 18, 19, 21 and 23, with $\sigma_{MD}$ and $\sigma_{TD}$ selected to be in the range of 600 kg/cm² to 1,000 kg/cm², provides a better molding stability and better thickness accuracy.

On the other hand, Table 3 indicates that since $\sigma_{MD}$ and $\sigma_{TD}$ of each of Control Examples 15 and 17 are less than 500 kg/cm² and $\sigma_{MD}$ and $\sigma_{TD}$ of each of Control Examples 16, 18 and 19 exceed 1,100 kg/cm², at least one of molding stability and thickness accuracy is defective.

Consequently, since the third embodiment provides good molding stability during the biaxial drawing of the nylon 6-66 film, continuous production of the film is smoothly performed. In addition, the thickness accuracy of the resulting biaxially oriented 6-66 film is improved to provide a quality product.

Hereinafter, a fourth embodiment of the present invention achieving the fourth object of the present invention will be described with reference to FIG. 1 as in each of the first to third embodiments. The descriptions of the same or similar arrangements as those of the first to third embodiments will be eliminated or abridged.

EXPERIMENTAL EXAMPLE 25

An extruder molded a multilayered rollstock film having the trilayer structure of a 49 microns thick nylon 6 layer/a 49 microns thick EVOH layer/a 49 microns thick nylon 6 layer. Then, a water cooling ring at a water temperature of 15° C. cooled the resulting multilayered rollstock film to produce a 147 microns thick tubular rollstock film 1. Experimental Example 25 employed the same nylon 6 as Experimental Example 1. An EVOH of a 38 mol % ethylene content was employed.

Then, the rollstock film 1 was nipped between a pair of nip rolls 2. Then, the hollow interior of the rollstock film 1 was forcibly blown with a gas, and a heater 3 at 310° C. concurrently heated the rollstock film 1. An air ring 4 concurrently blew 15 cm³/min air 5 to the draw start point of the rollstock film 1 to expand the rollstock film 1 in the form of a bubble 6. A pair of nip rolls 7 positioned downstream of the bubble 6 drew up the bubble 6. Thus, a simultaneous biaxial drawing operation was performed to produce a biaxially oriented multilayered film 8. The draw magnification in the film's machine direction (MD) was 3.0 and the draw magnification in the film's transverse direction (TD) was 3.2.

In the simultaneous biaxial drawing operation, the pressure in the bubble 6, radius of the bubble 6, rotational speed of each of the pairs of nip rolls 2 and nip rolls 7, and load on and torque of the drive motor were selected to be particular values thereby to adjust the maximal draw stress $\sigma_{MD}$ in the film's machine direction (MD) and the maximal draw stress $\sigma_{TD}$ in the film's transverse direction (TD) of the resulting film.

In accordance with Experimental Example 25, the maximal draw stress $\sigma_{MD}$ in the film's machine direction (MD) was 710 kg/cm² and the maximal draw stress $\sigma_{TD}$ in the film's transverse direction (TD) was 750 kg/cm².

These $\sigma_{MD}$ and $\sigma_{TD}$ were computed by the equations (1) and (2) wherein F=97 kg, $B_{MD}$=3.0, A=0.41 cm², T=486 k/gcm, r=5 cm, P=800×10⁻⁴ kg/cm², R=14.4 cm and t=15.3×10⁻⁴ cm.

In the production of the biaxially oriented multilayered film according to Experimental Example 25 with $\sigma_{MD}$ and $\sigma_{TD}$ selected to be above values, 24-hr continuous production of the film resulted in no bubble 6 being drawn experiencing a rocking etc. and the molding stability of the bubble 6 was very good. The thickness accuracy of the resulting multilayered film 8 was as good as 5.0% in thickness unevenness.

EXPERIMENTAL EXAMPLES 26 TO 36

Biaxially oriented multilayered films 8 of Experimental Examples 26 to 36 were produced as in Experimental Example 25. However, ethylene contents of EVOH, ratios between thicknesses of the first to third layers, MD draw magnifications, TD draw magnifications, air capacities of the air ring 4 and selected temperatures of the heater 3 were different among Experimental Examples 26 to 36 as shown on Table 4 provided hereinbelow. Only Experimental Example 36 provides a biaxially oriented multilayered film 8 having a double-layer structure of a nylon 6 layer/EVOH layer. A thickness ratio of the former layer to the latter layer is 2:1.

In each of Experimental Examples 26 to 36, the pressure in bubble 6, radius of the bubble 6, rotational speed of each of the pairs of nip rolls 2 and nip rolls 7, and load on and torque of the drive motor were selected to be particular values during the simultaneous drawing operation so that the maximal draw stress $\sigma_{MD}$ in the film's machine direction (MD) and maximal draw stress $\sigma_{TD}$ in the film's transverse direction (TD) essentially equaled the same adequate value.

In the production of a biaxially oriented multilayered film 8 of each Experimental Example with $\sigma_{MD}$ and $\sigma_{TD}$ selected to be respective adequate values, 24-hr continuous production was performed, the molding stability of the bubble 6 being drawn was watched and evaluated, and the thickness unevenness, i.e., thickness accuracy of a resulting biaxially oriented multilayered film 8 was measured and evaluated. In addition, the biaxially oriented multilayered film 8 was generally evaluated. The below Table 4 shows all of the results of the study, particular evaluations and general evaluations.

CONTROL EXAMPLES 20 TO 27

Biaxially oriented multilayered films 8 of Control Examples 20 to 27 were produced as in Experimental Examples 25 to 36. However, ethylene contents of EVOH, ratios between respective layer thicknesses of first through the third layers, MD draw magnifications, TD draw magnifications, air capacities of the air ring 4 and selected temperatures of the heater 3 were different among Control Examples 20 to 27 as shown on Table 4 provided hereinbelow. Only in accordance with Control Examples 26 and 27, preheating at 80° C. was applied to the multilayered film before the biaxial drawing operation.

In each of Control Examples 20 to 27 as in Experimental Examples 25 to 36, the pressure in the bubble 6, radius of the bubble 6, etc. were selected to be particular values during the simultaneous drawing operation so that the maximal draw stress $\sigma_{MD}$ in the film's machine direction (MD) and the maximal draw stress $\sigma_{TD}$ in the film's transverse direction (TD) essentially equaled the same suitable value.

In the production of a biaxially oriented multilayered film 8 of each Control Example with $\sigma_{MD}$ and $\sigma_{TD}$ selected to be respective adequate values, 24-hr continuous production was performed, the molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 4 shows all of the results of the study, particular evaluations and general evaluations.

Legends ⊚, ○, Δ and x used in the below Table 4 have the same meanings as those of Table 1.

TABLE 4

| | EVOH ethylene content (mol %) | Layer thick. accu. | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding stability | Thickness accuracy (%) | G.E. |
|---|---|---|---|---|---|---|---|---|---|---|---|---|
| Ex. Ex. 25 | 38 | 1:1:1 | 3.0 | 3.2 | 15 | 310 | 15 | 710 | 750 | ⊚ | ±5.0 ○ | ⊚ |
| Ex. Ex. 26 | 44 | 1:1:1 | 3.0 | 3.2 | 15 | 310 | 15 | 670 | 700 | ○ | ±6.0 ○ | ○ |
| Ex. Ex. 27 | 32 | 1:1:1 | 3.0 | 3.2 | 15 | 310 | 15 | 740 | 790 | ⊚ | ±4.5 ○ | ⊚ |
| Ex. Ex. 28 | 27 | 1:1:1 | 3.0 | 3.2 | 15 | 310 | 15 | 950 | 990 | ⊚ | ±4.0 ○ | ⊚ |
| Ex. Ex. 29 | 47 | 1:1:1 | 3.0 | 3.2 | 15 | 310 | 15 | 620 | 670 | ○ | ±6.5 ○ | ○ |
| Ex. Ex. 30 | 27 | 2:1:2 | 3.0 | 3.2 | 15 | 310 | 15 | 850 | 900 | ⊚ | ±5.0 ○ | ⊚ |
| Ex. Ex. 31 | 27 | 2:1:2 | 3.0 | 3.2 | 15 | 280 | 15 | 920 | 960 | ⊚ | ±4.0 ○ | ⊚ |
| Ex. Ex. 32 | 27 | 1:1:1 | 2.6 | 3.2 | 15 | 300 | 15 | 970 | 990 | ⊚ | ±3.5 ○ | ⊚ |
| Ex. Ex. 33 | 27 | 1:1:1 | 3.2 | 3.2 | 15 | 300 | 15 | 1080 | 1100 | ⊚ | ±5.0 ○ | ⊚ |
| Ex. Ex. 34 | 38 | 2:3:2 | 3.0 | 3.2 | 15 | 310 | 15 | 1150 | 1190 | ○ | ±4.5 ○ | ○ |
| Ex. Ex. 35 | 38 | 2:3:2 | 3.0 | 3.2 | 15 | 290 | 15 | 1230 | 1250 | ○ | ±4.5 ○ | ○ |

TABLE 4-continued

| | EVOH ethylene content (mol %) | Layer thick. accu. | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding stability | Thickness accuracy (%) | G.E. |
|---|---|---|---|---|---|---|---|---|---|---|---|---|
| Ex. Ex. 36 | 38 | 2:1 | 3.0 | 3.2 | 15 | 310 | 15 | 730 | 760 | ⊚ | ±5.0 ○ | ⊚ |
| Con. Ex. 20 | 38 | 2:3:2 | 3.0 | 3.2 | 15 | 260 | 15 | 1280 | 1330 | X rup. | ±4.5 ○ | X |
| Con. Ex. 21 | 27 | 2:3:2 | 3.0 | 3.2 | 15 | 260 | 15 | 1430 | 1470 | X rup. | ±4.0 ○ | X |
| Con. Ex. 22 | 38 | 2:1:2 | 3.0 | 3.2 | 5 | 310 | 15 | 490 | 540 | X unsta. | ±11.5 X | X |
| Con. Ex. 23 | 27 | 1:1:1 | 3.0 | 3.2 | 15 | 310 | 45 | 1390 | 1420 | X rup. | ±8.0 △ | X |
| Con. Ex. 24 | 47 | 1:1:1 | 3.0 | 3.2 | 15 | 380 | 15 | 440 | 430 | X unsta. | ±13.0 X | X |
| Con. Ex. 25 | 38 | 1:1:1 | 3.6 | 3.2 | 15 | 310 | 15 | 1320 | 1270 | X rup. | ±9.5 △ | X |
| Con. Ex. 26 | 38 | 1:1:1 | 3.0 | 3.2 | 15 | 310 | 15 | 1260 | 1290 | X rup. | ±11.0 X | X |
| Con. Ex. 27 | 27 | 1:1:1 | 3.0 | 3.2 | 15 | 310 | 15 | 1440 | 1480 | X rup. | ±9.0 △ | X |

Table 4 indicates that in accordance with Experimental Examples 25 to 36, since both the maximal draw stress $\sigma_{MD}$ in the film's machine direction (MD) and the maximal draw stress $\sigma_{TD}$ in the film's transverse direction (TD) are in the range of 600 kg/cm² to 1,250 kg/cm², good molding stability of the bubble 6 being drawn and good thickness accuracy of the biaxially oriented multilayered film 8 are provided. In particular, each of Experimental Examples 25, 27, 28, 30 to 33 and 36, with $\sigma_{MD}$ and $\sigma_{TD}$ selected to be in the range of 700 kg/cm² to 1,100 kg/cm², provides a better molding stability and thickness accuracy.

On the other hand, Table 4 indicates that since $\sigma_{MD}$ and $\sigma_{TD}$ of each of Control Examples 20, 21, 23 and 25 to 27 exceed 1,250 kg/cm² and $\sigma_{MD}$ and $\sigma_{TD}$ of each of Control Examples 22 and 24 are less than 600 kg/cm², at least one of molding stability and thickness accuracy is defective.

Consequently, since the fourth embodiment provides good molding stability during the biaxial drawing of the multilayered film comprising nylon 6 layer and EVOH layer, the continuous production of the film is performed smoothly. In addition, the thickness accuracy of the resulting biaxially oriented multilayered film is improved to provide a quality product.

Hereinafter, a fifth embodiment of the present invention achieving the fifth object of the present invention will be described with reference to FIG. 1 as in each of the first to fourth embodiments and in accordance with Experimental Examples 37 to 54 and Control Examples 28 to 34 as follows. The descriptions of the same or similar arrangements as those of the first to fourth embodiment will be eliminated or abridged.

EXPERIMENTAL EXAMPLE 37

An extruder comolded a multilayered rollstock film having a trilayer structure of a 90 microns thick nylon 6 layer/a 30 microns thick adhesive resin layer/a 30 microns L-LDPE layer. Then, a water cooling ring at a water temperature of 15° C. cooled the resulting multilayered rollstock film to produce a 150 microns thick tubular rollstock film 1. Experimental Example 37 employed the same nylon 6 as Experimental Example 1. The adhesive resin layer was UBE Bond F1100 (Trademark, a modified polyethylene resin produced by Ube Industries, Ltd.,), the L-LDPE layer was MORETECH0238CL (Trademark, produced by Idemitsu Petrochemical Co., Ltd., MI, i.e., melt index=2.0, d, i.e., density=0.925 g/cm³).

As shown in FIG. 1, the rollstock film 1 was nipped between a pair of nip rolls 2. Then, the hollow interior of the rollstock film 1 was forcibly blown with a gas, and a heater 3 at 350° C. concurrently heated the rollstock film 1. An air ring 4 concurrently blew 15 m³/min air 5 to the draw start point of the rollstock film 1 to expand the rollstock film 1 in the form of a bubble 6. A pair of nip rolls 7 positioned downstream of the bubble 6 drew up the bubble 6. Thus, a simultaneous biaxial drawing operation was performed to produce a biaxially oriented multilayered film 8. A draw magnification in the film's machine direction (MD) was 3.0 and a draw magnification in the film's transverse direction (TD) was 3.2.

In the simultaneous biaxial drawing operation, the pressure in the bubble 6, radius of the bubble 6, rotational speed (r.p.m) of each of the pairs of nip rolls 2 and nip rolls 7, and load on and torque of the drive motor were selected to be particular values thereby to adjust the maximal draw stress $\sigma_{MD}$ in the film's machine direction (MD) and maximal draw stress $\sigma_{TD}$ in the film's transverse direction (TD) of the resulting film.

In accordance with Experimental Example 37, the maximal draw stress $\sigma_{MD}$ in the film's machine direction (MD) was 560 kg/cm² and the maximal draw stress $\sigma_{TD}$ in the film's transverse direction (TD) was 550 kg/cm².

These $\sigma_{MD}$ and $\sigma_{TD}$ were computed by equations (1) and (2) wherein F=76.5 kg, $B_{MD}$=3.0, A=0.41 cm², T=383 k/gcm, r=5 cm, $\Delta P$=596×10⁻⁴ kg/cm², R=14.4 cm and t=15.6×10⁻⁴ cm.

In the production of the biaxially oriented multilayered film according to Experimental Example 37 with $\sigma_{MD}$ and $\sigma_{TD}$ selected to be the above values, 24-hr continuous production of the film provided that no bubble 6 being drawn experienced a rocking etc. and the molding stability of the bubble 6 was very good. The thickness accuracy of the resulting multilayered film 8 was as good as 4.5% in thickness unevenness.

EXPERIMENTAL EXAMPLES 38 TO 54

Biaxially oriented multilayered films 8 of Experimental Examples 38 to 54 were produced as in Experimental Example 37. However, an arrangement of the multilayered film 8, ratios between thicknesses of the layers, MD draw magnifications, TD draw magnifications, air capacities of the air ring 4 and selected temperatures of the heater 3 were different among Experimental Examples 38 to 54 as shown on Table 5 provided hereinbelow.

In the arrangements of the layers shown in Table 5, Ny 6 represents a nylon 6 layer, AD represents an adhesive resin layer, PE represents a linear low-density polyethylene (L-LDPE) layer, EVA represents an ethylene-vinyl acetate copolymer layer, IR represents an ionomer resin layer, EAA represents an ethyleneacrylic acid copolymer layer, EEA represents an ethylene-ethyl acrylate copolymer layer, PB-1 represents a polybutene-1 layer, PP represents a polypropylene layer, and LDPE represents a low-density polyethylene layer.

In each of Experimental Examples 38 to 54, the pressure in bubble 6, radius of the bubble 6, rotational speed of each of the pairs of nip rolls 2 and nip rolls 7, and load on and torque of the drive motor were selected to be particular values during the simultaneous drawing operation so that the maximal draw stress $\sigma_{MD}$ in the film's machine direction (MD) and maximal draw stress $\sigma_{MD}$ in the film's transverse direction (TD) essentially equaled the same adequate value.

In the production of a biaxially oriented multilayered film 8 of each Experimental Example with $\sigma_{MD}$ and $\sigma_{TD}$ selected to be respective adequate values, 24-hr continuous production was performed, the molding stability of the bubble 6 being drawn was watched and evaluated, and the thickness unevenness, i.e., thickness accuracy of the resulting biaxially oriented multilayered film 8 was measured and evaluated. In addition, the biaxially oriented multilayered film 8 was generally evaluated. The below Table 5 shows all of the results of the study, particular evaluations and general evaluations.

The particular resins of the layers employed in Experimental Examples 37 to 54 and Control Examples 28 to 34 are listed up as follows:

EVA—ULTRASEN UE540F (Trademark, produced by TOSOH CORPORATION, MI=3.0, d=0.927, Tm (i.e., a melting point)=96° C.), IR—HIMIRAN 1650 (Trademark, produced by DU PONT-Mitsui Polychemicals Co., Ltd., a Zn system, MI=5.0), EAA—PREMACALL 1410 (Trademark, produced by DOW Chemical Japan Limited)

EEA—EVAFLEX-EEA A701 (Trademark, produced by DU PONT-Mitsui Polychemicals Co., Ltd., MI=5.0), PB-1—polybuthylen 0200 (Trademark, produced by Shell CO., LTD., MI=2.0)

PP—Idemitsu POLYPRO F740-N (Trademark, produced by Idemitsu Petrochemical Co., Ltd., MI=7.0, d=0.9)

LDPE—UBE Polyethylene F222 (Trademark, produced by Ube Industries, Ltd., MI=2.0, d=0.922)

Legends ⊚, ○, △ and X used in the below Tables 5 to 13 have the same meanings as those of Table 1.

TABLE 5

| | Arrangement of layers | Layer thickness ratios | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding sta. | Thickness accuracy | G.E. |
|---|---|---|---|---|---|---|---|---|---|---|---|---|
| Ex. Ex. 37 | Ny6/AD/PE | 15:5:5 | 3.0 | 3.2 | 15 | 350 | 15 | 560 | 550 | ⊚ | ±4.5 ○ | ⊚ |
| Ex. Ex. 38 | Ny6/AD/PE | 15:5:5 | 3.0 | 3.2 | 15 | 320 | 15 | 680 | 660 | ⊚ | ±4.0 ○ | ⊚ |
| Ex. Ex. 39 | Ny6/AD/PE | 15:5:5 | 3.2 | 3.2 | 15 | 350 | 15 | 690 | 650 | ○ | ±5.5 ○ | ○ |
| Ex. Ex. 40 | Ny6/AD/PE | 15:5:5 | 2.8 | 3.2 | 15 | 350 | 15 | 430 | 410 | ○ | ±5.0 ○ | ○ |
| Ex. Ex. 41 | Ny6/AD/PE | 10:5:10 | 3.0 | 3.2 | 15 | 330 | 15 | 560 | 570 | ⊚ | ±4.5 ○ | ⊚ |
| Ex. Ex. 42 | Ny6/AD/PE | 10:5:10 | 3.4 | 3.2 | 15 | 330 | 15 | 640 | 650 | ⊚ | ±5.5 ○ | ⊚ |
| Ex. Ex. 43 | Ny6/AD/PE | 10:5:10 | 2.8 | 3.2 | 15 | 330 | 15 | 420 | 440 | ○ | ±5.0 ○ | ○ |
| Ex. Ex. 44 | Ny6/AD/PE | 8:5:12 | 3.4 | 3.2 | 15 | 320 | 15 | 630 | 670 | ○ | ±6.0 ○ | ○ |
| Ex. Ex. 45 | Ny6/AD/PE | 8:5:12 | 3.4 | 3.2 | 15 | 350 | 15 | 510 | 490 | ⊚ | ±6.0 ○ | ⊚ |
| Ex. Ex. 46 | PE/AD/Ny6/AD/PE | 5:3:9:3:5 | 3.0 | 3.2 | 15 | 330 | 15 | 580 | 600 | ⊚ | ±5.5 ○ | ⊚ |
| Ex. Ex. 47 | PE/AD/Ny6/AD/PE | 5:3:9:3:5 | 3.4 | 3.2 | 15 | 330 | 15 | 660 | 680 | ○ | ±5.0 ○ | ○ |
| Ex. Ex. 48 | Ny6/AD/EVA | 10:5:10 | 3.0 | 3.2 | 15 | 330 | 15 | 520 | 540 | ⊚ | ±4.5 ○ | ⊚ |
| Ex. Ex. 49 | Ny6/AD/IR | 10:5:10 | 3.0 | 3.2 | 15 | 330 | 15 | 610 | 590 | ⊚ | ±4.0 ○ | ⊚ |
| Ex. Ex. 50 | Ny6/AD/EAA | 10:5:10 | 3.0 | 3.2 | 15 | 330 | 15 | 620 | 640 | ⊚ | ±4.0 ○ | ⊚ |
| Ex. Ex. 51 | Ny6/AD/PP | 10:5:10 | 3.2 | 3.2 | 15 | 350 | 15 | 480 | 510 | ⊚ | ±5.0 ○ | ⊚ |
| Ex. Ex. 52 | Ny6/AD/PB-1 | 10:5:10 | 3.0 | 3.2 | 15 | 350 | 15 | 410 | 460 | ○ | ±5.5 ○ | ○ |
| Ex. Ex. 53 | Ny6/AD/PE | 10:5:10 | 3.0 | 3.2 | 15 | 330 | 15 | 430 | 440 | ○ | ±6.0 ○ | ○ |
| Ex. Ex. 54 | Ny6/AD/EEA | 10:5:10 | 3.0 | 3.2 | 15 | 330 | 15 | 580 | 600 | ⊚ | ±4.0 ○ | ⊚ |

PE: L-LDPE

CONTROL EXAMPLES 28 TO 34

Biaxially oriented multilayered films 8 of Control Examples 28 to 34 were produced as in Experimental Examples 37 to 54. However, arrangements of the multilayered films 8, ratios between the thicknesses of the layers of each multilayered film 8, MD draw magnifications, TD draw magnifications, air capacities of the air ring 4, selected temperatures of the heater 3 and temperatures of cooling water were different between Control Examples 28 to 34 as shown on Table 6 provided hereinbelow.

In each of Control Examples 28 to 34 as in Experimental Examples 37 to 54, the pressure in the bubble 6, radius of the bubble 6, etc. were selected to be particular values during the simultaneous draw operation so that the maximal drawing stress $\sigma_{MD}$ in the film's machine direction (MD) and the maximal draw stress $\sigma_{TD}$ in the film's transverse direction (TD) essentially equaled the same suitable value.

In the production of a biaxially oriented multilayered film 8 of each Control Example with $\sigma_{MD}$ and $\sigma_{TD}$ selected to be respective adequate values, 24-hr continuous production was performed, the molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 6 shows all of the results of the study, particular evaluations and general evaluations.

TABLE 6

| | Arrangement of layers | Layer thickness ratios | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding stability | Thickness accuracy | G.E. |
|---|---|---|---|---|---|---|---|---|---|---|---|---|
| Con. Ex. 28 | Ny6/AD/PE | 15:5:5 | 2.6 | 3.2 | 15 | 350 | 15 | 360 | 370 | X unsta. | ±8.0 △ | X |
| Con. Ex. 29 | Ny6/AD/PE | 15:5:5 | 3.0 | 3.2 | 15 | 280 | 15 | 810 | 840 | X rup. | ±4.5 ○ | X |
| Con. Ex. 30 | Ny6/AD/PE | 15:5:10 | 3.8 | 3.2 | 15 | 330 | 15 | 790 | 820 | X rup. | ±12.0 X | X |

TABLE 6-continued

|  | Arrangement of layers | Layer thickness ratios | Draw magni. MD | TD | Air capacity (m³/min) | Heater (°C.) | Cooling water (°C.) | Draw stress $\sigma_{MD}$ | $\sigma_{TD}$ | Molding stability | Thickness accuracy | G.E. |
|---|---|---|---|---|---|---|---|---|---|---|---|---|
| Con. Ex. 31 | Ny6/AD/PE | 15:5:10 | 3.4 | 3.2 | 15 | 380 | 15 | 380 | 350 | X unsta. | ±11.0 X | X |
| Con. Ex. 32 | Ny6/AD/PE | 10:5:10 | 2.6 | 3.2 | 15 | 330 | 15 | 340 | 360 | X unsta. | ±7.5 Δ | X |
| Con. Ex. 33 | Ny6/AD/PE | 8:5:12 | 3.8 | 3.2 | 15 | 320 | 15 | 760 | 710 | X rup. | ±13.0 X | X |
| Con. Ex. 34 | Ny6/AD/PE | 15:5:5 | 3.0 | 3.2 | 15 | 320 | 45 | 840 | 870 | X rup. | ±10.5 X | X |

PE: L-LDPE

Table 5 indicates that in the process in accordance with each of Experimental Examples 37 to 54 for producing a multilayered film 8 biaxially oriented by a tubular film process and comprising a nylon 6 layer, an adhesive resin layer and a polyolefin layer, since both the maximal draw stress $\sigma_{MD}$ in the film's machine direction (MD) and the maximal draw stress $\sigma_{TD}$ in the film's transverse direction (TD) are in the range of 400 kg/cm² to 700 kg/cm², good molding stability of the bubble 6 being drawn and good thickness accuracy of the biaxially oriented multilayered film 8 are provided. In particular, each of Experimental Examples 37, 38, 41, 42, 45, 46, 48 to 51 and 54 with $\sigma_{MD}$ and $\sigma_{TD}$ selected to be in the range of 450 kg/cm² to 650 kg/², provides better molding stability and thickness accuracy.

On the other hand, Table 6 indicates that since $\sigma_{MD}$ and $\sigma_{TD}$ of each of Control Examples 29, 30, 33 and 34 exceed 700 kg/cm² and $\sigma_{MD}$ and $\sigma_{TD}$ of each of Control Examples 28, 31 and 32 are below 400 kg/cm², at least one of molding stability and thickness accuracy is defective.

Hereinafter, a sixth embodiment of the present invention achieving the sixth object of the present invention will be described with reference to FIG. 1 as in each of the first to fifth embodiments and by means of Experimental Examples 55 to 74 and Control Examples 35 to 42. The descriptions of the same or similar arrangements as those of the first to fifth embodiment will be eliminated or abridged.

EXPERIMENTAL EXAMPLES 55 TO 74

Biaxially oriented multilayered films 8 of Experimental Examples 55 to 74 were produced as in the above Experimental Examples 37 to 54. However, arrangements of the multilayered films 8, ratios between the thicknesses of the layers etc., were different between Experimental Examples 55 to 74 as shown on Table 7 provided hereinbelow.

In the arrangements of layer shown in Table 7, EVOH represents an ethylene-vinyl acetate copolymer saponification product, each parenthesized numeral following EVOH represents an ethylene content (at mol %) of EVOH.

EVOHs employed in Experimental Examples 55 to 74 and Control Examples 35 to 42 are listed up as follows:

EVOH (27 mol %)—EVAL EP-L (produced by Kuraray Co., Ltd., hereinafter, the same)
EVOH (32 mol %)—EVAL EP-F
EVOH (38 mol %)—EVAL EP-H
EVOH (44 mol %)—EVAL EP-E
EVOH (48 mol %)—EVAL EP-G.

In each of Experimental Examples 55 to 74 as in Experimental Examples 37 to 54, the pressure in bubble 6, radius of the bubble 6, etc., each of the pairs of nip rolls 2 and nip rolls 7, and load were selected to be particular values during the simultaneous drawing operation so that the maximal draw stress $\sigma_{MD}$ in the film's machine direction (MD) and the maximal draw stress $\sigma_{MD}$ in the film's transverse direction (TD) essentially equaled the same adequate value.

In the production of a biaxially oriented multilayered film 8 of each Experimental Example with $\sigma_{MD}$ and $\sigma_{TD}$ were selected to be respective adequate values, 24-hr continuous production was performed, the molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 7 shows all of the results of the study, particular evaluations and general evaluations.

TABLE 7

|  | Arrangement of layers (ethylene content mol %) | Layer thickness ratios | Draw magni. MD | TD | Air capacity (m³/min) | Heater (°C.) | Cooling water (°C.) | Draw stress $\sigma_{MD}$ | $\sigma_{TD}$ | Molding sta. | Thickness accuracy | G.E. |
|---|---|---|---|---|---|---|---|---|---|---|---|---|
| Ex. Ex. 55 | Ny6/EVOH(38)/Ny6/AD/PE | 8:4:8:4:8 | 3.4 | 3.2 | 15 | 340 | 15 | 660 | 750 | ⊚ | ±5.5 ○ | ⊚ |
| Ex. Ex. 56 | Ny6/EVOH(38)/Ny6/AD/PE | 8:4:8:4:8 | 3.4 | 3.2 | 15 | 310 | 15 | 820 | 850 | ○ | ±4.5 ○ | ○ |
| Ex. Ex. 57 | Ny6/EVOH(38)/Ny6/AD/PE | 8:4:8:4:8 | 3.0 | 3.2 | 15 | 340 | 15 | 550 | 690 | ⊚ | ±5.0 ○ | ⊚ |
| Ex. Ex. 58 | Ny6/EVOH(38)/Ny6/AD/PE | 8:4:8:4:8 | 2.8 | 3.2 | 15 | 340 | 15 | 510 | 540 | ○ | ±4.5 ○ | ○ |
| Ex. Ex. 59 | Ny6/EVOH(38)/Ny6/AD/PE | 6:4:6:4:12 | 3.4 | 3.2 | 15 | 340 | 15 | 590 | 660 | ⊚ | ±6.0 ○ | ⊚ |
| Ex. Ex. 60 | Ny6/EVOH(38)/Ny6/AD/PE | 6:4:6:4:12 | 3.4 | 3.2 | 15 | 310 | 15 | 740 | 730 | ⊚ | ±5.5 ○ | ⊚ |
| Ex. Ex. 61 | Ny6/EVOH(38)/Ny6/AD/PE | 6:4:6:4:12 | 2.8 | 3.2 | 15 | 340 | 15 | 460 | 490 | ○ | ±5.5 ○ | ○ |
| Ex. Ex. 62 | Ny6/EVOH(27)/Ny6/AD/PE | 8:4:8:4:8 | 3.4 | 3.2 | 15 | 340 | 15 | 800 | 840 | ○ | ±5.0 ○ | ○ |
| Ex. Ex. 63 | Ny6/EVOH(27)/Ny6/AD/PE | 8:4:8:4:8 | 3.0 | 3.2 | 15 | 340 | 15 | 680 | 740 | ⊚ | ±4.5 ○ | ⊚ |
| Ex. Ex. 64 | Ny6/EVOH(47)/Ny6/AD/PE | 8:4:8:4:8 | 3.4 | 3.2 | 15 | 340 | 15 | 570 | 600 | ⊚ | ±6.0 ○ | ⊚ |
| Ex. Ex. 65 | Ny6/EVOH(47)/ | 8:4:8:4:8 | 3.0 | 3.2 | 15 | 340 | 15 | 480 | 560 | ○ | ±5.5 ○ | ○ |

TABLE 7-continued

| | Arrangement of layers (ethylene content mol %) | Layer thickness ratios | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding sta. | Thickness accuracy | G.E. |
|---|---|---|---|---|---|---|---|---|---|---|---|---|
| Ex. Ex. 66 | Ny6/AD/PE PE/AD/Ny6/ EVOH(38)/ | 6:2:6:4:6:2:6 | 3.4 | 3.2 | 15 | 340 | 15 | 630 | 660 | ⊚ | ±5.5 ○ | ⊚ |
| Ex. Ex. 67 | Ny6/AD/PE PE/AD/Ny6/ EVOH(38)/ | 6:2:6:4:6:2:6 | 3.0 | 3.2 | 15 | 340 | 15 | 570 | 580 | ⊚ | ±5.0 ○ | ⊚ |
| Ex. Ex. 68 | Ny6/AD/PE Ny6/EVOH(38)/ Ny6/AD/EVA | 8:4:8:4:8 | 3.2 | 3.2 | 15 | 340 | 15 | 610 | 640 | ⊚ | ±5.0 ○ | ⊚ |
| Ex. Ex. 69 | Ny6/EVOH(38)/ Ny6/AD/IR | 8:4:8:4:8 | 3.2 | 3.2 | 15 | 340 | 15 | 680 | 710 | ⊚ | ±4.0 ○ | ⊚ |
| Ex. Ex. 70 | Ny6/EVOH(38)/ Ny6/AD/EAA | 8:4:8:4:8 | 3.2 | 3.2 | 15 | 340 | 15 | 690 | 650 | ⊚ | ±4.5 ○ | ⊚ |
| Ex. Ex. 71 | Ny6/EVOH(38)/ Ny6/AD/PP | 8:4:8:4:8 | 3.4 | 3.2 | 15 | 360 | 15 | 560 | 580 | ⊚ | ±5.0 ○ | ⊚ |
| Ex. Ex. 72 | Ny6/EVOH(38)/ Ny6/AD/PB-1 | 8:4:8:4:8 | 3.2 | 3.2 | 15 | 360 | 15 | 530 | 510 | ○ | ±5.5 ○ | ○ |
| Ex. Ex. 73 | Ny6/EVOH(38)/ Ny6/AD/LDPE | 8:4:8:4:8 | 3.4 | 3.2 | 15 | 340 | 15 | 490 | 520 | ○ | ±6.0 ○ | ○ |
| Ex. Ex. 74 | Ny6/EVOH(38)/ Ny6/AD/EEA | 8:4:8:4:8 | 3.2 | 3.2 | 15 | 340 | 15 | 710 | 670 | ⊚ | ±4.5 ○ | ⊚ |

PE: L-LDPE

CONTROL EXAMPLES 35 TO 42

Biaxially oriented multilayered films 8 of Control Examples 35 to 42 were produced as in Experimental Examples 55 to 74. However, arrangements of the multilayered films 8, ratios between the thicknesses of the layers of each multilayered film 8 etc. were different between Control Examples 35 to 42 as shown on Table 8 provided hereinbelow.

The continuous production of a biaxially oriented multilayered film 8 of each of Control Examples 35 to 42 was performed with production conditions selected so that $\sigma_{MD}$ and $\sigma_{TD}$ were selected to be equal adequate values during the simultaneous biaxial drawing operation, as in Experimental Examples 55 to 74. The molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 8 shows all of the results of the study, particular evaluations and general evaluations.

Table 7 indicates that in the process in accordance with each of Experimental Examples 55 to 74 for producing a multilayered film 8 biaxially oriented by tubular film process and comprising a nylon 6 layer, an EVOH layer, an adhesive resin layer and a polyolefin layer, since both the maximal draw stress $\sigma_{MD}$ in the film's machine direction (MD) and the maximal draw stress $\sigma_{TD}$ in the film's transverse direction (TD) are in the range of 450 kg/cm² to 850 kg/cm², good molding stability of the bubble 6 being drawn and good thickness accuracy of the biaxially oriented multilayered film 8 are provided. In particular, each of Experimental Examples 55, 57, 59, 60, 63, 64, 66 to 71 and 74, with $\sigma_{MD}$ and $\sigma_{TD}$ selected to be in the range of 550 kg/cm² to 750 kg/cm², provides better molding stability and thickness accuracy.

On the other hand, Table 7 indicates that since $\sigma_{MD}$ and $\sigma_{TD}$ of each of Control Examples 36, 38, 39, and 41 exceed 850 kg/cm² and $\sigma_{MD}$ and $\sigma_{TD}$ of each of Control Examples 37, 40 and 42 are less than 450 kg/cm², at least one of molding stability and thickness accuracy is defective.

Hereinafter, a seventh embodiment of the present invention achieving the seventh object of the present invention will be described with reference to FIG. 1 as in each of the first to sixth embodiments and by means of Experimental Examples 75 to 86 and Control Exam-

TABLE 8

| | Arrangement of layers (ethylene content mol %) | Layer thickness ratios | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding stability | Thickness accuracy | G.E. |
|---|---|---|---|---|---|---|---|---|---|---|---|---|
| Con. Ex. 35 | Ny6/EVOH(38)/ Ny6/AD/PE | 8:4:8:4:8 | 3.4 | 3.2 | 15 | 280 | 15 | 910 | 930 | X rup. | ±4.5 ○ | X |
| Con. Ex. 36 | Ny6/EVOH(38)/ Ny6/AD/PE | 8:4:8:4:8 | 2.6 | 3.2 | 15 | 340 | 15 | 420 | 440 | X unsta. | ±6.0 ○ | X |
| Con. Ex. 37 | Ny6/EVOH(38)/ Ny6/AD/PE | 8:4:8:4:8 | 3.0 | 3.2 | 15 | 400 | 15 | 400 | 410 | X unsta. | ±10.5 △ | X |
| Con. Ex. 38 | Ny6/EVOH(38)/ Ny6/AD/PE | 8:4:8:4:8 | 3.4 | 3.2 | 15 | 340 | 45 | 970 | 990 | X rup. | ±15.0 X | X |
| Con. Ex. 39 | Ny6/EVOH(38)/ Ny6/AD/PE | 6:4:6:4:12 | 3.8 | 3.2 | 15 | 310 | 15 | 860 | 880 | X rup. | ±11.5 X | X |
| Con. Ex. 40 | Ny6/EVOH(38)/ Ny6/AD/PE | 6:4:6:4:12 | 2.8 | 3.2 | 15 | 380 | 15 | 390 | 420 | X unsta. | ±12.0 X | X |
| Con. Ex. 41 | Ny6/EVOH(27)/ Ny6/AD/PE | 8:4:8:4:8 | 3.4 | 3.2 | 15 | 310 | 15 | 930 | 890 | X rup. | ±2.0 △ | X |
| Con. Ex. 42 | Ny6/EVOH(47)/ Ny6/AD/PE | 8:4:8:4:8 | 3.0 | 3.2 | 15 | 380 | 15 | 360 | 390 | X unsta. | ±13.0 X | X |

PE: L-LDPE ples 43 to 50. The descriptions of the same or similar arrangements as those of the first to sixth embodiment will be eliminated or abridged.

EXPERIMENTAL EXAMPLES 75 TO 86

Biaxially oriented multilayered films 8 of Experimental Examples 75 to 86 were produced as in the sixth embodiment. Each of the biaxially multilayered film 8 has a trilayered structure of a nylon 6-66 layer/EVOH layer/nylon 6-66 layer. However, the ratios between the thicknesses of the layers etc. were different between Experimental Examples 75 to 86 as shown on Table 9 provided hereinbelow.

Only Experimental Example 86 produced a biaxially oriented multilayered film 8 having a double-layered structure of a nylon 6-66 layer/EVOH layer. The thickness ratio between the layers is 2:1. Experimental Examples 75 to 86 and Control Examples 43 to 50 employed the same nylon 6-66 as Experimental Example 18.

In each of Experimental Examples 75 to 86, the pressure in the bubble 6, radius of the bubble 6 etc. were selected to be particular values during the simultaneous drawing operation so that the maximal draw stress $\sigma_{MD}$ in the film's machine direction (MD) and maximal draw stress $\sigma_{MD}$ in the film's transverse direction (TD) essentially equaled the same adequate value.

In the production of a biaxially oriented multilayered film 8 of each Experimental Example with $\sigma_{MD}$ and $\sigma_{TD}$ selected to be respective adequate values, a 24-hr continuous production was performed, the molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 9 shows all of the results of the study, particular evaluations and general evaluations.

CONTROL EXAMPLES 43 TO 50

Biaxially oriented multilayered films 8 of Control Examples 43 to 50 were produced as in Experimental Examples 75 to 86. Arrangements of the biaxially oriented multilayered films 8 equal those of Experimental Examples 75 to 86. However, the ratios between the thicknesses of the layers of each multilayered film 8, etc. were different between Control Examples 43 to 50 as shown on Table 9 provided hereinbelow.

The continuous production of a biaxially oriented multilayered film 8 of each of Control Examples 43 to 50 was performed with production conditions selected so that $\sigma_{MD}$ and $\sigma_{MD}$ were selected to be equal adequate values during the simultaneous biaxial drawing operation, as in Experimental Examples 75 to 86. The molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 9 shows all of the results of the study, particular evaluations and general evaluations.

TABLE 9

| | EVOH ethylene content (mol %) | Layer thick. accu. | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding stability | thickness accuracy (%) | G.E. |
|---|---|---|---|---|---|---|---|---|---|---|---|---|
| Ex. Ex. 75 | 38 | 1:1:1 | 3.1 | 3.2 | 15 | 300 | 15 | 620 | 630 | ⊚ | ±4.5 ○ | ⊚ |
| Ex. Ex. 76 | 44 | 1:1:1 | 3.1 | 3.2 | 15 | 300 | 15 | 580 | 590 | ○ | ±5.5 ○ | ○ |
| Ex. Ex. 77 | 32 | 1:1:1 | 3.1 | 3.2 | 15 | 300 | 15 | 650 | 680 | ⊚ | ±4.0 ○ | ⊚ |
| Ex. Ex. 78 | 27 | 1:1:1 | 3.1 | 3.2 | 15 | 300 | 15 | 860 | 880 | ⊚ | ±3.5 ○ | ⊚ |
| Ex. Ex. 79 | 47 | 1:1:1 | 3.1 | 3.2 | 15 | 300 | 15 | 530 | 560 | ○ | ±6.0 ○ | ○ |
| Ex. Ex. 80 | 27 | 2:1:2 | 3.1 | 3.2 | 15 | 300 | 15 | 760 | 790 | ⊚ | ±4.5 ○ | ⊚ |
| Ex. Ex. 81 | 27 | 2:1:2 | 3.1 | 3.2 | 15 | 270 | 15 | 830 | 850 | ⊚ | ±3.5 ○ | ⊚ |
| Ex. Ex. 82 | 27 | 1:1:1 | 2.7 | 3.2 | 15 | 290 | 15 | 880 | 880 | ⊚ | ±3.0 ○ | ⊚ |
| Ex. Ex. 83 | 27 | 1:1:1 | 3.3 | 3.2 | 15 | 290 | 15 | 990 | 970 | ⊚ | ±4.5 ○ | ⊚ |
| Ex. Ex. 84 | 38 | 2:3:2 | 3.1 | 3.2 | 15 | 300 | 15 | 1050 | 1040 | ○ | ±4.0 ○ | ○ |
| Ex. Ex. 85 | 38 | 2:3:2 | 3.1 | 3.2 | 15 | 280 | 15 | 1140 | 1150 | ○ | ±4.0 ○ | ○ |
| Ex. Ex. 86 | 38 | 2:1:2 | 3.1 | 3.2 | 15 | 300 | 15 | 640 | 670 | ⊚ | ±4.5 ○ | ⊚ |
| Con. Ex. 43 | 38 | 2:3:2 | 3.1 | 3.2 | 15 | 250 | 15 | 1190 | 1240 | X rup. | ±4.5 | X |
| Con. Ex. 44 | 27 | 2:3:2 | 3.1 | 3.2 | 15 | 250 | 15 | 1340 | 1360 | X rup. | ±4.0 | X |
| Con. Ex. 45 | 38 | 2:1:2 | 3.1 | 3.2 | 5 | 300 | 15 | 400 | 450 | X unsta. | ±12.0 X | X |
| Con. Ex. 46 | 27 | 1:1:1 | 3.1 | 3.2 | 15 | 300 | 45 | 1310 | 1330 | X rup. | ±9.0 △ | X |
| Con. Ex. 47 | 47 | 1:1:1 | 3.1 | 3.2 | 15 | 370 | 15 | 350 | 340 | X unsta. | ±13.5 X | X |
| Con. Ex. 48 | 32 | 1:1:1 | 3.6 | 3.2 | 15 | 300 | 15 | 1230 | 1180 | X rup. | ±10.0 △ | X |
| Con. Ex. 49 | 38 | 1:1:1 | 3.1 | 3.2 | 15 | 300 | 15 | 1160 | 1190 | X rup. | ±11.5 X | X |
| Con. Ex. 50 | 27 | 1:1:1 | 3.1 | 3.2 | 15 | 300 | 15 | 1350 | 1370 | X rup. | ±8.5 △ | X |

Table 9 indicates that in the process in accordance with each of Experimental Examples 75 to 86 for producing a multilayered film 8 biaxially oriented by a tubular film process and comprising nylon 6-66 layers and an EVOH layer, since both the maximal draw stress $\sigma_{MD}$ in the film's machine direction (MD) and maximal draw stress $\sigma_{TD}$ in the film's transverse direction (TD) are in the range of 500 kg/cm² to 1,150 kg/cm², good molding stability of the bubble 6 being drawn and good thickness accuracy of the biaxially oriented multilayered film 8 are provided. In particular, each of Experimental Examples 75, 77, 78, 80 to 83 and 86, with $\sigma_{MD}$ and $\sigma_{TD}$ selected to be in the range of 600 kg/cm² to 1,000 kg/cm², provides better molding stability and thickness accuracy.

On the other hand, Table 9 indicates that since $\sigma_{MD}$ and $\sigma_{TD}$ of each of Control Examples 43, 44, 46 and 48 to 50 exceed 1,150 kg/cm² and $\sigma_{MD}$ and $\sigma_{TD}$ of each of Control Examples 45 and 47 are below 500 kg/cm², at least one of molding stability and thickness accuracy is defective.

Hereinafter, an eighth embodiment of the present invention achieving the eighth object of the present invention will be described with reference to FIG. 1 as in each of the first to seventh embodiments and by means of Experimental Examples 87 to 106 and Control Examples 51 to 58. The descriptions of the same or a similar arrangement as those of the first to the seventh embodiments will be eliminated or abridged.

EXPERIMENTAL EXAMPLES 87 TO 106

Table 10 shows all of the results of the study, particular evaluations and general evaluations.

TABLE 10

| | Arrangement of layers (ethylene content mol %) | Layer thickness ratios | Draw magni. MD | Draw magni. TD | Air capacity (m³/min) | Heater (°C.) | Cool. water (°C.) | Draw stress $\sigma_{MD}$ | Draw stress $\sigma_{TD}$ | Mold. stabi. | Thick. accu. | G.E. |
|---|---|---|---|---|---|---|---|---|---|---|---|---|
| Ex. Ex. 87 | Ny6-66/EVOH(38)/Ny6-66/AD/PE | 8:4:8:4:8 | 3.4 | 3.2 | 15 | 340 | 15 | 550 | 640 | ⊚ | ±5.0 ○ | ⊚ |
| Ex. Ex. 88 | Ny6-66/EVOH(38)/Ny6-66/AD/PE | 8:4:8:4:8 | 3.4 | 3.2 | 15 | 310 | 15 | 720 | 750 | ○ | ±5.0 ○ | ○ |
| Ex. Ex. 89 | Ny6-66/EVOH(38)/Ny6-66/AD/PE | 8:4:8:4:8 | 3.0 | 3.2 | 15 | 340 | 15 | 450 | 590 | ⊚ | ±5.5 ○ | ⊚ |
| Ex. Ex. 90 | Ny6-66/EVOH(38)/Ny6-66/AD/PE | 8:4:8:4:8 | 2.8 | 3.2 | 15 | 340 | 15 | 380 | 430 | ○ | ±5.0 ○ | ○ |
| Ex. Ex. 91 | Ny6-66/EVOH(38)/Ny6-66/AD/PE | 6:4:6:4:12 | 3.4 | 3.2 | 15 | 340 | 15 | 510 | 580 | ⊚ | ±6.0 ○ | ⊚ |
| Ex. Ex. 92 | Ny6-66/EVOH(38)/Ny6-66/AD/PE | 6:4:6:4:12 | 3.4 | 3.2 | 15 | 310 | 15 | 660 | 710 | ○ | ±5.5 ○ | ○ |
| Ex. Ex. 93 | Ny6-66/EVOH(38)/Ny6-66/AD/PE | 6:4:6:4:12 | 2.8 | 3.2 | 15 | 340 | 15 | 360 | 390 | ○ | ±5.0 ○ | ○ |
| Ex. Ex. 94 | Ny6-66/EVOH(27)/Ny6-66/AD/PE | 8:4:8:4:8 | 3.4 | 3.2 | 15 | 340 | 15 | 680 | 730 | ○ | ±5.5 ○ | ○ |
| Ex. Ex. 95 | Ny6-66/EVOH(27)/Ny6-66/AD/PE | 8:4:8:4:8 | 3.0 | 3.2 | 15 | 340 | 15 | 560 | 620 | ⊚ | ±5.0 ○ | ⊚ |
| Ex. Ex. 96 | Ny6-66/EVOH(47)/Ny6-66/AD/PE | 8:4:8:4:8 | 3.4 | 3.2 | 15 | 340 | 15 | 460 | 490 | ⊚ | ±6.0 ○ | ⊚ |
| Ex. Ex. 97 | Ny6-66/EVOH(47)/Ny6-66/AD/PE | 8:4:8:4:8 | 3.0 | 3.2 | 15 | 340 | 15 | 370 | 410 | ○ | ±5.5 ○ | ○ |
| Ex. Ex. 98 | PE/AD/Ny6-66/EVOH(38)/Ny6-66/AD/PE | 6:2:6:4:6:2:6 | 3.4 | 3.2 | 15 | 340 | 15 | 520 | 560 | ⊚ | ±5.5 ○ | ⊚ |
| Ex. Ex. 99 | PE/AD/Ny6-66/EVOH(38)/Ny6-66/AD/PE | 6:2:6:4:6:2:6 | 3.0 | 3.2 | 15 | 340 | 15 | 450 | 470 | ⊚ | ±5.0 ○ | ⊚ |
| Ex. Ex. 100 | Ny6-66/EVOH(38)/Ny6-66/AD/EVA | 8:4:8:4:8 | 3.4 | 3.2 | 15 | 340 | 15 | 510 | 530 | ⊚ | ±5.0 ○ | ⊚ |
| Ex. Ex. 101 | Ny6-66/EVOH(38)/Ny6-66/AD/IR | 8:4:8:4:8 | 3.2 | 3.2 | 15 | 340 | 15 | 570 | 560 | ⊚ | ±4.0 ○ | ⊚ |
| Ex. Ex. 102 | Ny6-66/EVOH(38)/Ny6-66/AD/EAA | 8:4:8:4:8 | 3.2 | 3.2 | 15 | 340 | 15 | 590 | 570 | ⊚ | ±4.5 ○ | ⊚ |
| Ex. Ex. 103 | Ny6-66/EVOH(38)/Ny6-66/AD/PP | 8:4:8:4:8 | 3.4 | 3.2 | 15 | 360 | 15 | 470 | 450 | ⊚ | ±5.5 ○ | ⊚ |
| Ex. Ex. 104 | Ny6-66/EVOH(38)/Ny6-66/AD/PB-1 | 8:4:8:4:8 | 3.2 | 3.2 | 15 | 360 | 15 | 430 | 420 | ○ | ±6.0 ○ | ○ |
| Ex. Ex. 105 | Ny6-66/EVOH(38)/Ny6-66/AD/LDPE | 8:4:8:4:8 | 3.4 | 3.2 | 15 | 340 | 15 | 390 | 410 | ○ | ±6.0 ○ | ○ |
| Ex. Ex. 106 | Ny6-66/EVOH(38)/Ny6-66/AD/EEA | 8:4:8:4:8 | 3.2 | 3.2 | 15 | 340 | 15 | 600 | 620 | ⊚ | ±4.5 ○ | ⊚ |

PE: L-LDPE

Biaxially oriented multilayered films 8 of Experimental Examples 87 to 106 were produced as in the seventh embodiment. However, arrangement of the multilayered film 8, ratios between the thicknesses of the layers, etc. were different among Experimental Examples 87 to 106 as shown on Table 10 provided hereinbelow.

In each of Experimental Examples 87 to 106, the pressure in bubble 6, radius of the bubble 6, etc. were selected to be particular values during the simultaneous drawing operation so that the maximal draw stress $\sigma_{MD}$ in the film's machine direction (MD) and maximal draw stress $\sigma_{TD}$ in the film's transverse direction (TD) essentially equaled the same adequate value.

In the production of a biaxially oriented multilayered film 8 in each Experimental Example 87 to 106, with $\sigma_{MD}$ and $\sigma_{TD}$ selected to be respective adequate values, 24-hr continuous production was performed, the molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 10 shows all of the results of the study, particular evaluations and general evaluations.

CONTROL EXAMPLES 51 TO 58

Biaxially oriented multilayered films 8 of Control Examples 51 to 58 were produced as in Experimental Examples 87 to 106. However, arrangements of the multilayered films 8, ratios between the thicknesses of the layers of each multilayered film 8, etc. were different among Control Examples 51 to 58 as shown on Table 11 provided hereinbelow.

Continuous production of a biaxially oriented multilayered film 8 of each of Control Examples 51 to 58 was performed with the production conditions selected so that $\sigma_{MD}$ and $\sigma_{TD}$ were selected to be equal adequate values during the simultaneous biaxial drawing operation, as in Experimental Examples 87 to 106. The molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 11 shows all of the results of the study, particular evaluations and general evaluations.

TABLE 11

| | Arrangement of layers (ethylene content mol %) | Layer thickness ratios | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding stability | Thickness accuracy | G.E. |
|---|---|---|---|---|---|---|---|---|---|---|---|---|
| Con. Ex. 51 | Ny6-66/EVOH(38)/Ny6-66/AD/PE | 8:4:8:4:8 | 3.4 | 3.2 | 15 | 280 | 15 | 830 | 820 | X rup. | ±5.0 ○ | X |
| Con. Ex. 52 | Ny6-66/EVOH(38)/Ny6-66/AD/PE | 8:4:8:4:8 | 2.6 | 3.2 | 15 | 340 | 15 | 320 | 340 | X unsta. | ±5.0 ○ | X |
| Con. Ex. 53 | Ny6-66/EVOH(38)/Ny6-66/AD/PE | 8:4:8:4:8 | 3.0 | 3.2 | 15 | 400 | 15 | 300 | 310 | X unsta. | ±12.0 X | X |
| Con. Ex. 54 | Ny6-66/EVOH(38)/Ny6-66/AD/PE | 8:4:8:4:8 | 3.4 | 3.2 | 15 | 340 | 45 | 910 | 930 | X rup. | ±13.0 X | X |
| Con. Ex. 55 | Ny6-66/EVOH(38)/Ny6-66/AD/PE | 6:4:6:4:12 | 3.8 | 3.2 | 15 | 310 | 15 | 760 | 790 | X rup. | ±10.5 △ | X |
| Con. Ex. 56 | Ny6-66/EVOH(38)/Ny6-66/AD/PE | 6:4:6:4:12 | 2.8 | 3.2 | 15 | 380 | 15 | 290 | 320 | X unsta. | ±11.5 X | X |
| Con. Ex. 57 | Ny6-66/EVOH(27)/Ny6-66/AD/PE | 8:4:8:4:8 | 3.4 | 3.2 | 15 | 310 | 15 | 810 | 840 | X rup. | ±6.0 ○ | X |
| Con. Ex. 58 | Ny6-66/EVOH(47)/Ny6-66/AD/PE | 8:4:8:4:8 | 3.0 | 3.2 | 15 | 380 | 15 | 280 | 300 | X unsta. | ±12.5 X | X |

PE: L-LDPE

Table 10 indicates that in the process in accordance with each of Experimental Examples 87 to 106 for producing a multilayered film 8 biaxially oriented by a tubular film process and comprising a nylon 6-66 layer, an EVOH layer, an adhesive resin layer and a polyolefin layer, since both the maximal draw stress $\sigma_{MD}$ in the film's machine direction (MD) and maximal draw stress $\sigma_{TD}$ in the film's transverse direction (TD) are in the range of 350 kg/cm² to 750 kg/cm², good molding stability of the bubble 6 being drawn and good thickness accuracy of the biaxially oriented multilayered film 8 are provided. In particular, each of Experimental Examples 87, 89, 91, 95, 96, 98 to 103 and 106, with $\sigma_{MD}$ and $\sigma_{TD}$ selected to be in the range of 450 kg/cm² to 650 kg/cm², provides better molding stability and thickness accuracy.

On the other hand, Table 11 indicates that since $\sigma_{MD}$ and $\sigma_{TD}$ of each of Control Examples 51, 54, 55 and 57 exceed 750 kg/cm² and $\sigma_{MD}$ and $\sigma_{TD}$ of each of Control Examples 53, 54, 56 and 58 are below 350 kg/cm², at least one of molding stability and thickness accuracy is defective.

Hereinafter, a ninth embodiment of the present invention achieving the ninth object of the present invention will be described with reference to FIG. 1 as in each of the first to eighth embodiments and by means of the following Experimental Examples 107 to 125 and Control Examples 59 to 65. The descriptions of the same or similar arrangements as those of the first to eighth embodiments will be eliminated or abridged.

EXPERIMENTAL EXAMPLES 107 TO 125

Biaxially oriented multilayered films 8 of Experimental Examples 107 to 125 were produced as in the eighth embodiment. However, the arrangement of the multilayered film 8, ratios between the thicknesses of the layers, etc. were different between Experimental Examples 107 to 125 as shown on Table 12 provided hereinbelow.

In each of Experimental Examples 107 to 125, the pressure in bubble 6, radius of the bubble 6, etc. were selected to be particular values during the simultaneous drawing operation so that the maximal draw stress $\sigma_{MD}$ in the film's machine direction (MD) and the maximal draw stress $\sigma_{TD}$ in the film's transverse direction (TD) essentially equaled the same adequate value.

In the production of a biaxially oriented multilayered film 8 of each Experimental Example with $\sigma_{MD}$ and $\sigma_{TD}$ selected to be respective adequate values, 24-hr continuous production was performed, the molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 12 shows all of the results of the study, particular evaluations and general evaluations.

TABLE 12

| | Arrangement of layers | Layer thickness ratios | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding sta. | Thickness accuracy | G.E. |
|---|---|---|---|---|---|---|---|---|---|---|---|---|
| Ex. Ex. 107 | Ny6-66/AD/PE | 15:8:5 | 3.0 | 3.2 | 15 | 340 | 15 | 390 | 420 | ◎ | ±5.0 ○ | ◎ |
| Ex. Ex. 108 | Ny6-66/AD/PE | 15:8:5 | 3.0 | 3.2 | 15 | 310 | 15 | 520 | 480 | ◎ | ±4.5 ○ | ◎ |
| Ex. Ex. 109 | Ny6-66/AD/PE | 15:8:5 | 3.2 | 3.2 | 15 | 320 | 15 | 590 | 560 | ○ | ±5.5 ○ | ○ |
| Ex. Ex. 110 | Ny6-66/AD/PE | 15:8:5 | 2.8 | 3.2 | 15 | 320 | 15 | 410 | 430 | ◎ | ±5.0 ○ | ◎ |
| Ex. Ex. 111 | Ny6-66/AD/PE | 10:5:10 | 3.0 | 3.2 | 15 | 320 | 15 | 380 | 420 | ◎ | ±5.0 ○ | ◎ |
| Ex. Ex. 112 | Ny6-66/AD/PE | 10:5:10 | 3.4 | 3.2 | 15 | 320 | 15 | 500 | 450 | ◎ | ±6.0 ○ | ◎ |
| Ex. Ex. 113 | Ny6-66/AD/PE | 7:5:13 | 3.4 | 3.2 | 15 | 320 | 15 | 510 | 460 | ◎ | ±5.5 ○ | ◎ |
| Ex. Ex. 114 | Ny6-66/AD/PE | 7:5:13 | 3.0 | 3.2 | 15 | 340 | 15 | 360 | 340 | ○ | ±6.0 ○ | ○ |
| Ex. Ex. 115 | Ny6-66/AD/PE | 5:5:15 | 3.6 | 3.2 | 15 | 320 | 15 | 570 | 500 | ○ | ±6.0 ○ | ○ |
| Ex. Ex. 116 | Ny6-66/AD/PE | 5:5:15 | 3.0 | 3.2 | 15 | 330 | 15 | 320 | 340 | ○ | ±5.0 ○ | ○ |
| Ex. Ex. 117 | PE/AD/Ny6-66/AD/PE | 5:3:9:3:5 | 3.0 | 3.2 | 15 | 320 | 15 | 440 | 450 | ◎ | ±5.5 ○ | ◎ |
| Ex. Ex. 118 | PE/AD/Ny6-66/AD/PE | 5:3:9:3:5 | 3.4 | 3.2 | 15 | 320 | 15 | 510 | 470 | ◎ | ±5.0 ○ | ◎ |
| Ex. Ex. 119 | Ny6-66/AD/EVA | 10:5:10 | 3.0 | 3.2 | 15 | 320 | 15 | 360 | 400 | ◎ | ±4.5 ○ | ◎ |
| Ex. Ex. 120 | Ny6-66/AD/IR | 10:5:10 | 3.0 | 3.2 | 15 | 320 | 15 | 420 | 450 | ◎ | ±4.0 ○ | ◎ |
| Ex. Ex. 121 | Ny6-66/AD/EAA | 10:5:10 | 3.0 | 3.2 | 15 | 320 | 15 | 440 | 430 | ◎ | ±4.0 ○ | ◎ |
| Ex. Ex. 122 | Ny6-66/AD/PP | 10:5:10 | 3.2 | 3.2 | 15 | 340 | 15 | 350 | 370 | ◎ | ±5.0 ○ | ◎ |

TABLE 12-continued

| | Arrangement of layers | Layer thickness ratios | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding sta. | Thickness accuracy | G.E. |
|---|---|---|---|---|---|---|---|---|---|---|---|---|
| Ex. Ex. 123 | Ny6-66/AD/PB-1 | 10:5:10 | 3.0 | 3.2 | 15 | 340 | 15 | 320 | 350 | ○ | ±6.0 ○ | ○ |
| Ex. Ex. 124 | Ny6-66/AD/LDPE | 10:5:10 | 3.0 | 3.2 | 15 | 320 | 15 | 310 | 330 | ○ | ±5.5 ○ | ○ |
| Ex. Ex. 125 | Ny6-66/AD/EEA | 10:5:10 | 3.0 | 3.2 | 15 | 320 | 15 | 440 | 420 | ◉ | ±4.5 ○ | ◉ |

PE: L-LDPE

CONTROL EXAMPLES 59 TO 65

Biaxially oriented multilayered films 8 of Control Examples 59 to 65 were produced as in Experimental Examples 107 to 125. However, the arrangements of the multilayered films 8, ratios between the thicknesses of the layers of each multilayered film 8, etc. were different between Control Examples 59 to 65 as shown on Table 13 provided hereinbelow.

Continuous production of a biaxially oriented multilayered film 8 of each of Control Examples 59 to 65 was performed with production conditions selected so that $\sigma_{MD}$ and $\sigma_{TD}$ were selected to be equal adequate values during the simultaneous biaxial drawing operation, as in Experimental Examples 107 to 125. The molding stability of the bubble 6 being drawn was watched and evaluated, and the thickness accuracy of the resulting biaxially oriented multilayered film 8 was measured and evaluated. In addition, the biaxially oriented multilayered film 8 was generally evaluated. The below Table 13 shows all of the results of the study, particular evaluations and general evaluations.

TABLE 13

| | Arrangement of layers | Layer thickness ratios | Draw magni. MD | Draw magni. TD | Air capacity (m³/min) | Heater (°C.) | Cooling water (°C.) | Draw stress $\sigma_{MD}$ | Draw stress $\sigma_{TD}$ | Molding stability | Thickness accuracy | G.E. |
|---|---|---|---|---|---|---|---|---|---|---|---|---|
| Con. Ex. 59 | Ny6-66/AD/PE | 15:5:5 | 3.0 | 3.2 | 15 | 380 | 15 | 270 | 290 | X unsta. | ±12.0 X | X |
| Con. Ex. 60 | Ny6-66/AD/PE | 15:5:5 | 3.4 | 3.2 | 15 | 320 | 15 | 880 | 720 | X rup. | ±11.0 X | X |
| Con. Ex. 61 | Ny6-66/AD/PE | 15:5:5 | 3.0 | 3.2 | 15 | 270 | 15 | 620 | 660 | X rup. | ±6.5 Δ | X |
| Con. Ex. 62 | Ny6-66/AD/PE | 10:5:10 | 3.0 | 3.2 | 15 | 360 | 45 | 250 | 260 | X unsta. | ±10.5 X | X |
| Con. Ex. 63 | Ny6-66/AD/PE | 10:5:10 | 2.6 | 3.2 | 15 | 340 | 15 | 240 | 270 | X unsta. | ±7.0 Δ | X |
| Con. Ex. 64 | Ny6-66/AD/PE | 10:5:10 | 3.6 | 3.2 | 15 | 300 | 15 | 670 | 630 | X rup. | ±11.5 X | X |
| Con. Ex. 65 | Ny6-66/AD/PE | 5:5:15 | 3.8 | 3.2 | 15 | 300 | 15 | 640 | 610 | X rup. | ±13.0 X | X |

PE: L-LDPE

Table 12 indicates that in the process in accordance with each of Experimental Examples 107 to 125 for producing a multilayered film 8 biaxially oriented by a tubular film process and comprising a nylon 6-66 layer, an adhesive resin layer and a polyolefin layer, since both the maximal draw stress $\sigma_{MD}$ in the film's machine direction (MD) and maximal draw stress $\sigma_{TD}$ in the film's transverse direction (MD) are in the range of 300 kg/cm² to 600 kg/cm², a good molding stability of the bubble 6 being drawn and good thickness accuracy of the biaxially oriented multilayered film 8 are provided. In particular, each of Experimental Examples 107, 108, 110 to 113, 117 to 122 and 125, with $\sigma_{MD}$ and $\sigma_{TD}$ selected to be in the range of 350 kg/cm² to 550 kg/cm², provides better molding stability and thickness accuracy.

On the other hand, Table 13 indicates that since $\sigma_{MD}$ and $\sigma_{TD}$ of each of Control Examples 61, 62, 64 and 65 exceed 600 kg/cm² and $\sigma_{MD}$ and $\sigma_{TD}$ of each of Control Examples 59, 62 and 63 are below 300 kg/cm², at least one of molding stability and thickness accuracy is defective.

What is claimed is:

1. In a process of producing a single-layered nylon film which is biaxially oriented by a tubular film process comprising a step of drawing the nylon film, the improvement comprising maintaining the maximal draw stress, $\sigma_{MD}$, in said single-layered nylon film's machine direction from 500 kg/cm² to 1,500 kg/cm² and the maximal draw stress, $\sigma_{TD}$, in said single-layered nylon film's transverse direction from 500 kg/cm² to 1,500 kg/cm², $\sigma_{MD}$ being defined by the following equation (I):

$$\sigma_{MD}=(F\times B_{MD})/A \quad (I),$$

wherein F is the draw force in kg and equals T/r, where T is the torque of a nip roll in kg/cm and r is the radius of the nip roll in cm, $B_{MD}$ is the draw magnification in the machine direction and A is the cross-sectional area in cm² of rollstock film, and $\sigma_{TD}$ being defined by the following equation (II):

$$\sigma_{TD}=(\Delta P\times R)/t \quad (II),$$

wherein $\Delta P$ is the bubble pressure in kg/cm², R is the bubble radius in cm and t is the film thickness in cm, during the drawing of the film.

2. A process for producing a biaxially oriented single-layered film as recited in claim 1, wherein said single-layered nylon film comprises a nylon 6 film and $\sigma_{MD}$ and $\sigma_{TD}$ are defined to be in the following ranges of:

$$600 \text{ kg/cm}^2 \leq \sigma_{MD} \leq 1,300 \text{ kg/cm}^2$$

$$600 \text{ kg/cm}^2 \leq \sigma_{TD} \leq 1,300 \text{ kg/cm}^2.$$

3. A process for producing a biaxially oriented single-layered film as recited in claim 1, wherein said single-layered nylon film comprises a nylon 66 film $\sigma_{MD}$ and $\sigma_{TD}$ are selected to be in the following ranges of:

$$700 \text{ kg/cm}^2 \leq \sigma_{MD} 1,500 \text{ kg/cm}^2$$

$$700 \text{ kg/cm}^2 \leq \sigma_{TD} 1,500 \text{ kg/cm}^2.$$

4. A process for producing a biaxially oriented single-layered film as recited in claim 1, wherein said single-layered nylon film comprises a nylon 6-66 film and $\sigma_{MD}$ and $\sigma_{TD}$ are selected to be in the following ranges of:

$$500 \text{ kg/cm}^2 \leq \sigma_{MD} \leq 1,100 \text{ kg/cm}^2$$

$$500 \text{ kg/cm}^2 \leq \sigma_{TD} \leq 1,100 \text{ kg/cm}^2.$$

5. In a process of producing a multilayered nylon film which is biaxially oriented by a tubular film process comprising a step of drawing the nylon film, the improvement comprising maintaining the maximal draw stress, $\sigma_{MD}$, in the multilayered nylon film's machine direction from 300 kg/cm² to 1,250 kg/cm² and the maximal draw stress, $\sigma_{TD}$, in said multilayered nylon film's transverse direction from 300 kg/cm² to 1,250 kg/cm², $\sigma_{MD}$ being defined by the following equation (I):

$$\sigma_{MD} = (F \times B_{MD})/A \qquad (I),$$

wherein F is the draw force in kg and equals T/r, where T is the torque of a nip roll in kg/cm and r is the radius of the nip roll in cm, $B_{MD}$ is the draw magnification in the machine direction and A is the cross-sectional area in cm² of rollstock film, and $\sigma_{TD}$ being defined by the following equation (II):

$$\sigma_{TD} = (\Delta P \times R)/t \qquad (II),$$

wherein $\Delta P$ is the bubble pressure in kg/cm², R is the bubble radius in cm and t is the film thickness in cm, during the drawing of the film.

6. A process for producing a biaxially oriented multilayered film as recited in claim 5, wherein said multilayered nylon film comprises a nylon 6 layer and an ethylenevinyl acetate saponification product (EVOH) layer, and $\sigma_{MD}$ and $\sigma_{TD}$ are selected to be in the following ranges of:

$$600 \text{ kg/cm}^2 \leq \sigma_{MD} \leq 1,250 \text{ kg/cm}^2$$

$$600 \text{ kg/cm}^2 \leq \sigma_{TD} \leq 1,250 \text{ kg/cm}^2.$$

7. A process for producing a biaxially oriented multilayered film as recited in claim 5, wherein said multilayered nylon film comprises a nylon 6 layer, an adhesive resin layer and a polyolefin layer, and $\sigma_{MD}$ and $\sigma_{TD}$ are selected to be in the following ranges of:

$$400 \text{ kg/cm}^2 \leq \sigma_{MD} \leq 700 \text{ kg/cm}^2$$

$$400 \text{ kg/cm}^2 \leq \sigma_{TD} \leq 700 \text{ kg/cm}^2.$$

8. A process for producing a biaxially oriented multilayered film as recited in claim 5, wherein said multilayered nylon film comprises a nylon 6 layer, an ethylenevinyl acetate saponification product (EVOH) layer, an adhesive resin layer and a polyolefin layer, and $\sigma_{MD}$ and $\sigma_{TD}$ are selected to be in the following ranges of:

$$450 \text{ kg/cm}^2 \leq \sigma_{MD} \leq 850 \text{ kg/cm}^2$$

$$450 \text{ kg/cm}^2 \leq \sigma_{TD} \leq 850 \text{ kg/cm}^2.$$

9. A process for producing a biaxially oriented multilayered film as recited in claim 5, wherein said multilayered nylon film comprises a nylon 6-66 layer and an ethylenevinyl acetate saponification product (EVOR) layer, and $\sigma_{MD}$ and $\sigma_{TD}$ are selected to be in the following ranges of:

$$500 \text{ kg/cm}^2 \leq \sigma_{MD} \leq 1,150 \text{ kg/cm}^2$$

$$500 \text{ kg/cm}^2 \leq \sigma_{TD} \leq 1,150 \text{ kg/cm}^2.$$

10. A process for producing a biaxially oriented multilayered film as recited in claim 5, wherein said multilayered nylon film comprises a nylon 6-66 layer, an ethylenevinyl acetate saponification product (EVOH) layer, an adhesive layer and a polyolefin layer, and $\sigma_{MD}$ and $\sigma_{TD}$ are selected to be in the following ranges of:

$$350 \text{ kg/cm}^2 \leq \sigma_{MD} \leq 750 \text{ kg/cm}^2$$

$$350 \text{ kg/cm}^2 \leq \sigma_{TD} \leq 750 \text{ kg/cm}^2.$$

11. A process for producing a biaxially oriented multilayered film as recited in claim 5, wherein said multilayered nylon film comprises a nylon 6-66 film layer, an adhesive resin layer and a polyolefin layer, and $\sigma_{MD}$ and $\sigma_{TD}$ are selected to be in the following ranges of:

$$300 \text{ kg/cm}^2 \leq \sigma_{MD} \leq 600 \text{ kg/cm}^2$$

$$300 \text{ kg/cm}^2 \leq \sigma_{TD} \leq 600 \text{ kg/cm}^2.$$

* * * * *

UNITED STATES PATENT AND TRADEMARK OFFICE
CERTIFICATE OF CORRECTION

PATENT NO. : 5 094 799
DATED : March 10, 1992
INVENTOR(S) : Masao TAKASHIGE et al It is certified that error appears in the above-identified patent and that said Letters Patent is hereby corrected as shown below:

Column 34, line 57; after "film" insert ---and---.
Column 34, line 60; change

"$700 \text{ kg/cm}^2 \leq \sigma_{MD} \ 1,500 \text{ kg/cm}^2$" to

---$700 \text{ kg/cm}^2 \leq \sigma_{MD} \leq 1,500 \text{ kg/cm}^2$---.

Column 34, line 62; change

"$700 \text{ kg/cm}^2 \leq \sigma_{TD} \ 1,500 \text{ kg/cm}^2$" to

---$700 \text{ kg/cm}^2 \leq \sigma_{TD} \leq 1,500 \text{ kg/cm}^2$---.

Column 36, line 18; change "(EVOR)" to ---(EVOH)---.

Signed and Sealed this

Thirty-first Day of August, 1993

*Attest:*

BRUCE LEHMAN

*Attesting Officer*     *Commissioner of Patents and Trademarks*